(12) United States Patent
Saito et al.

(10) Patent No.: US 12,430,083 B2
(45) Date of Patent: Sep. 30, 2025

(54) INFORMATION PROCESSING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventors: Kazuyuki Saito, Kanagawa (JP); Shinya Suzuki, Chiba (JP); Akihiro Yasuda, Chiba (JP); Kazushige Shimada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,775

(22) Filed: Apr. 11, 2023

(65) Prior Publication Data

US 2023/0333786 A1  Oct. 19, 2023

(30) Foreign Application Priority Data

Apr. 18, 2022 (JP) ................................. 2022-068065

(51) Int. Cl.
*G06F 3/12* (2006.01)

(52) U.S. Cl.
CPC .......... *G06F 3/1205* (2013.01); *G06F 3/1232* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 8,854,669 B1 * | 10/2014 | Jazayeri ................ | G06F 3/1288 |
| | | | 358/1.15 |
| 2020/0073603 A1 * | 3/2020 | Kaneda ................. | G06F 3/1228 |
| 2020/0201585 A1 * | 6/2020 | Miyajima ............. | G06F 3/1207 |
| 2020/0409624 A1 * | 12/2020 | Saigusa ................. | G06F 21/608 |
| 2021/0055893 A1 * | 2/2021 | Saigusa ................. | G06F 3/1208 |
| 2023/0333786 A1 * | 10/2023 | Saito ..................... | G06F 3/1228 |

FOREIGN PATENT DOCUMENTS

JP  2021124791 A  8/2021

* cited by examiner

*Primary Examiner* — Helen Zong
(74) *Attorney, Agent, or Firm* — Canon U.S.A., Inc. IP Division

(57) ABSTRACT

An information processing apparatus configured to store information about a printer includes an acquisition unit configured to acquire first capability information defined by a predetermined protocol and second capability information not defined by the predetermined protocol, a display unit configured to display a first object to set a setting value for a first setting item based on the acquired first capability information, and display a second object to set a setting value for a second setting item based on the acquired second capability information, and a transmission unit configured to transmit a first setting value set via the first object and a second setting value set via the second object.

21 Claims, 18 Drawing Sheets

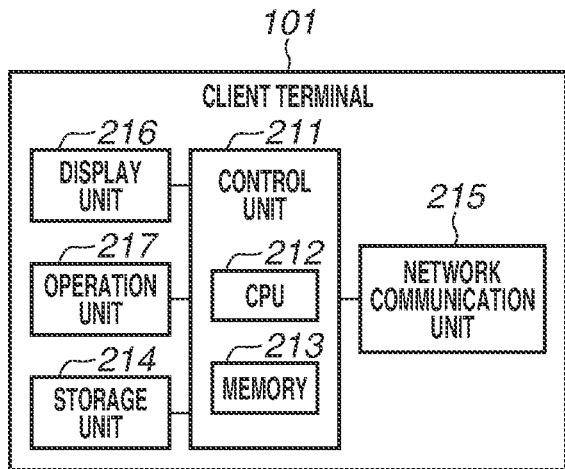
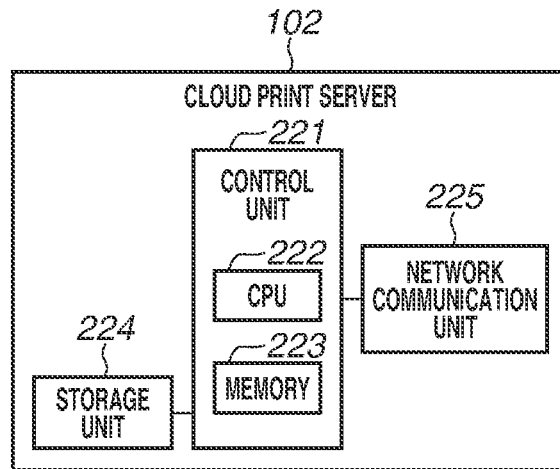
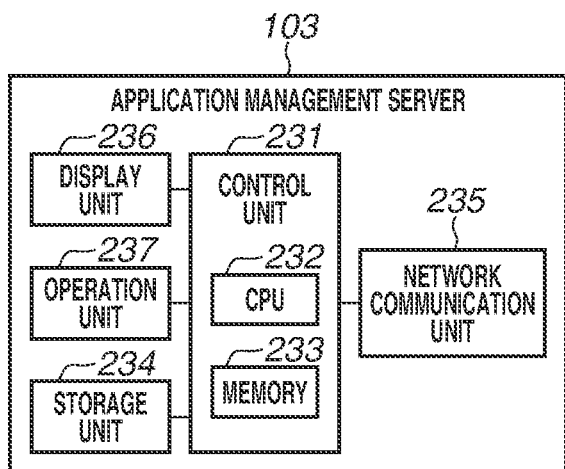
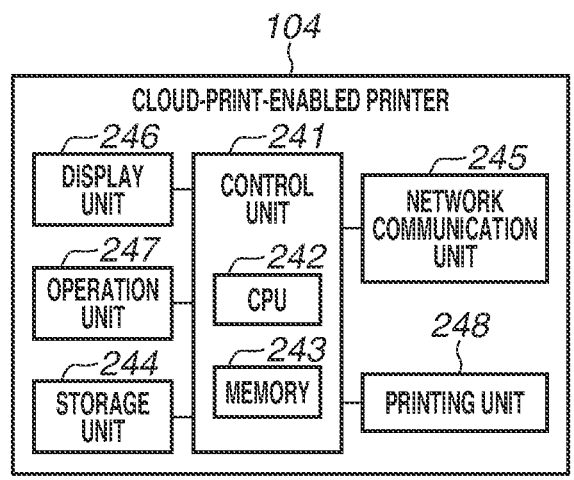
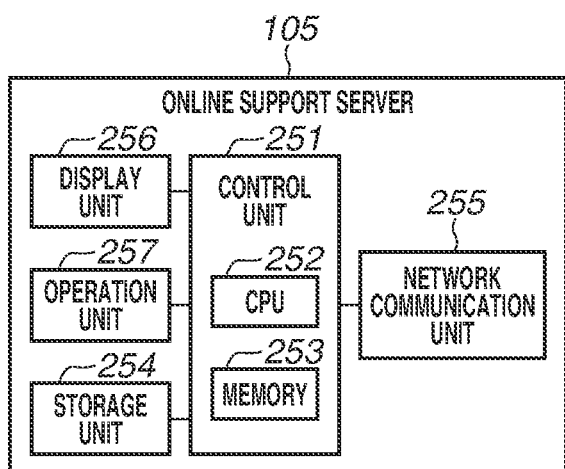

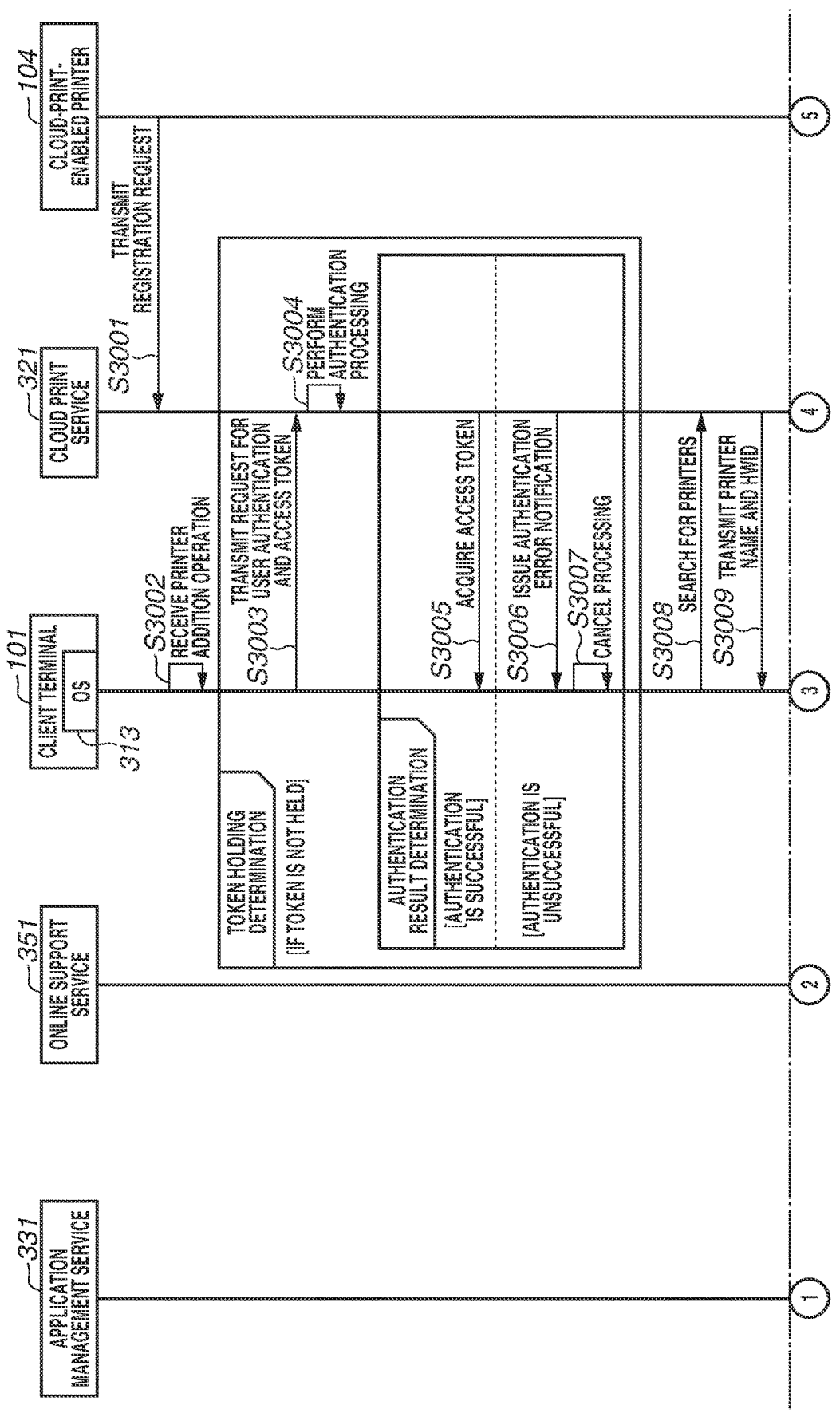

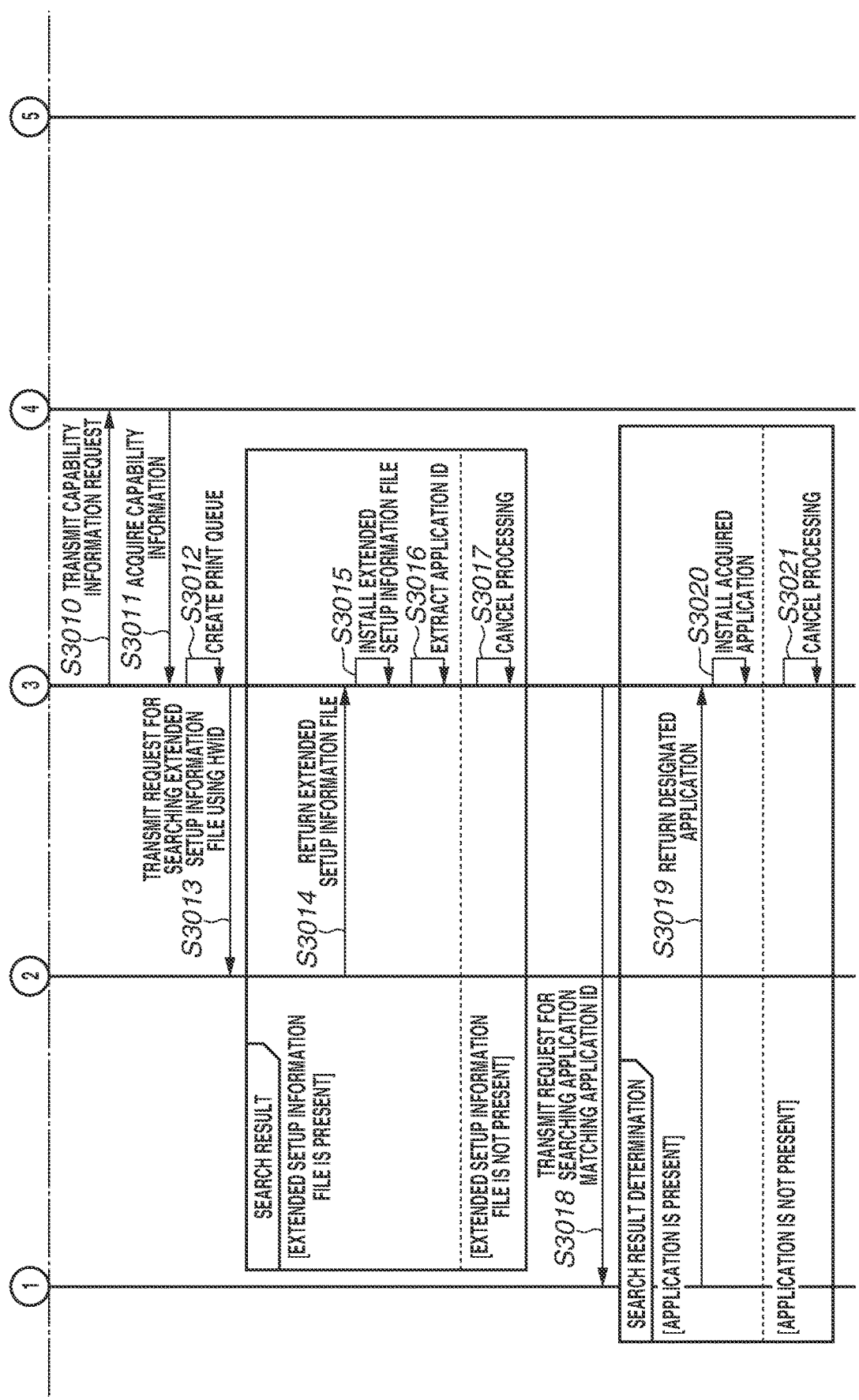

FIG.5

| ITEM NAME | ATTRIBUTE VALUE |
|---|---|
| SHEET SIZE | A6/A5/A4/B5/LETTER/LEGAL/EXECUTIVE/POSTCARD/#10 ENVELOPE PORTRAIT /DL ENVELOPE PORTRAIT/ENVELOPE (YOU 4) PORTRAIT /ENVELOPE (CHOU 3) PORTRAIT/ENVELOPE (CHOU 4) PORTRAIT /ENVELOPE C5 PORTRAIT/ENVELOPE MONARCH PORTRAIT/L/4 × 6 (KG SIZE) /5 × 7/6P (8 × 10)/SQUARE (127 mm)/BUSINESS CARD (CARD) /ENVELOPE (YOU 6) PORTRAIT/SQUARE (89 mm)/SQUARE (4 × 4) |
| SHEET TYPE | ENVELOPE/LABEL/PLAIN PAPER/PHOTO PAPER /PHOTO PAPER GLOSSY STANDARD/PHOTO PAPER MATTE /INKJET POSTCARD (COMMUNICATION SIDE)/INKJET POSTCARD (ADDRESS SIDE) /INKJET PHOTO POSTCARD (COMMUNICATION SIDE) /IINKJET PHOTO POSTCARD (ADDRESS SIDE) |
| NUMBER OF COPIES | MAX = 99 |
| SHEET ORIENTATION | PORTRAIT/LANDSCAPE |
| PRINT QUALITY | STANDARD/ROUGH |
| PRINT IN UNITS OF COPIES | ON/OFF |
| STAPLING | NONE/AUTO/UPPER LEFT/LOWER LEFT/UPPER RIGHT/LOWER RIGHT /LEFT EDGE (TWO-POSITION BINDING)/UPPER EDGE (TWO-POSITION BINDING) /RIGHT EDGE (TWO-POSITION BINDING)/LOWER EDGE (TWO-POSITION BINDING) /SADDLE STITCH |
| PUNCHING | NONE/PUNCH HOLES (AUTO)/PUNCH HOLES (TWO HOLES LEFT) /PUNCH HOLES (THREE HOLES LEFT)/PUNCH HOLES (FOUR HOLES LEFT) /PUNCH HOLES (MULTIPLE HOLES LEFT)/PUNCH HOLES (TWO HOLES RIGHT) /PUNCH HOLES (THREE HOLDS RIGHT)/PUNCH HOLES (FOUR HOLES RIGHT) /PUNCH HOLES (MULTIPLE HOLES RIGHT)/PUNCH HOLES (TWO HOLES TOP) /PUNCH HOLES (THREE HOLES TOP)/PUNCH HOLES (FOUR HOLES TOP) /PUNCH HOLES (MULTIPLE HOLES TOP)/PUNCH HOLES (TWO HOLES BOTTOM) /PUNCH HOLES (THREE HOLES BOTTOM)/PUNCH HOLES (FOUR HOLES BOTTOM) /PUNCH HOLES (MULTIPLE HOLES BOTTOM) |
| FOLDING SETTING | NONE/HALF FOLD/C-FOLD/QUARTER-FOLD/TRI-FOLD-OUT/Z-FOLD /SADDLE-FOLD (OUTPUT FROM SADDLE FINISHER) |
| COLOR MODE | COLOR/MONOCHROME |
| N-IN-ONE PRINTING | OFF/2IN1/4IN1/6IN1/9IN1/16IN1 |
| PLACEMENT ORDER | FROM LEFT TO RIGHT/FROM RIGHT TO LEFT |
| MAGNIFICATION | NONE/FIT TO PAGE WIDTH/FIT TO SCREEN SIZE |
| DOUBLE-SIDED PRINTING | ONE-SIDED/DOUBLE-SIDED |
| BINDING DIRECTION | LONG-EDGE BINDING/SHORT-EDGE BINDING |
| 180-DEGREE ROTATION | NONE/LEFT ROTATION/RIGHT ROTATION |
| STORAGE OF JOBS IN PRINTER | ON/OFF |
| JOB NAME ABBREVIATION | ON/OFF |
| STAPLELESS BINDING | ON/OFF |

FIG.6A

```xml
<?xml version="1.0" encoding="utf-8"?>
<PrintDeviceCapabilities
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<psk:JobCopiesAllDocuments psf2:psftype="ParameterDef">
    <psf:DataType xsi:type="xsd:QName" psf2:psftype="Property">xsd:integer</psf:DataType>
    <psf:DefaultValue xsi:type="xsd:integer" psf2:psftype="Property">1</psf:DefaultValue>
    <psf:Mandatory xsi:type="xsd:QName" psf2:psftype="Property">psk:Unconditional</psf:Mandatory>
    <psf:MaxValue xsi:type="xsd:integer" psf2:psftype="Property">999</psf:MaxValue>
    <psf:MinValue xsi:type="xsd:integer" psf2:psftype="Property">1</psf:MinValue>
    <psf:Multiple xsi:type="xsd:integer" psf2:psftype="Property">1</psf:Multiple>
    <psf:UnitType xsi:type="xsd:string" psf2:psftype="Property">copies</psf:UnitType>
  </psk:JobCopiesAllDocuments>

<psk:PageMediaSize psf2:psftype="Feature">
    <psk:ISOA4 psf2:psftype="Option">
      <psk12:PortraitImageableSize xsi:type="psf2:ImageableAreaType" psf2:psftype="Property">12700,12700,184600,271600</psk12:PortraitImageableSize>
      <psk:MediaSizeHeight xsi:type="xsd:integer" psf2:psftype="ScoredProperty">297000</psk:MediaSizeHeight>
      <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option" psf2:default="true">
      <psk12:PortraitImageableSize xsi:type="psf2:ImageableAreaType" psf2:psftype="Property">12700,12700,190500,254000</psk12:PortraitImageableSize>
      <psk:MediaSizeHeight xsi:type="xsd:integer" psf2:psftype="ScoredProperty">279400</psk:MediaSizeHeight>
      <psk:MediaSizeWidth xsi:type="xsd:integer" psf2:psftype="ScoredProperty">215900</psk:MediaSizeWidth>
    </psk:NorthAmericaLetter>
  </psk:PageMediaSize>

<psk:PageOrientation psf2:psftype="Feature">
    <psk:Landscape psf2:psftype="Option"/>
    <psk:Portrait psf2:psftype="Option" psf2:default="true"/>
  </psk:PageOrientation>

..................

<psk:PageOutputColor psf2:psftype="Feature">
    <psk:Color psf2:psftype="Option" psf2:default="true">
      <psk:DeviceBitsPerPixel xsi:type="xsd:integer" psf2:psftype="ScoredProperty">24</psk:DeviceBitsPerPixel>
      <psk:DriverBitsPerPixel xsi:type="xsd:integer" psf2:psftype="ScoredProperty">24</psk:DriverBitsPerPixel>
    </psk:Color>
  </psk:PageOutputColor>
</PrintDeviceCapabilities>
```

FIG.6B-1

```xml
<?xml version="1.0" encoding="UTF-8"?>
<PrintDeviceCapabilities
  xmlns:ns0000="http://schemas.microsoft.com/windows/2018/04/printing/printschemakeywords/ipp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<!--copies-default, copies-supported -->
<psk:JobCopiesAllDocuments psf2:psftype="ParameterDef">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
</psk:JobCopiesAllDocuments>

<!--media-default, media-supported, media-col-database -->
<psk:PageMediaSize psf2:psftype="Feature">
    <psk:JapanHagakiPostcard psf2:psftype="Option" psf2:default="false">
        <psk:MediaSizeWidth xsi:type="xsd:integer" psf2:psftype="ScoredProperty">100000</psk:MediaSizeWidth>
        <psk:MediaSizeHeight xsi:type="xsd:integer" psf2:psftype="ScoredProperty">148000</psk:MediaSizeHeight>
        <psk12:PortraitImageableSize xsi:type="psf2:ImageableAreaType" psf2:psftype="Property">3400,5000,93200,138000</psk12:PortraitImageableSize>
        <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
        <psk:MediaSizeWidth xsi:type="xsd:integer" psf2:psftype="ScoredProperty">148000</psk:MediaSizeWidth>
        <psk:MediaSizeHeight xsi:type="xsd:integer" psf2:psftype="ScoredProperty">210000</psk:MediaSizeHeight>
        <psk12:PortraitImageableSize xsi:type="psf2:ImageableAreaType" psf2:psftype="Property">3400,5000,141200,200000</psk12:PortraitImageableSize>
        <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
        <psk:MediaSizeWidth xsi:type="xsd:integer" psf2:psftype="ScoredProperty">210000</psk:MediaSizeWidth>
        <psk:MediaSizeHeight xsi:type="xsd:integer" psf2:psftype="ScoredProperty">297000</psk:MediaSizeHeight>
        <psk12:PortraitImageableSize xsi:type="psf2:ImageableAreaType" psf2:psftype="Property">3400,5000,203200,287000</psk12:PortraitImageableSize>
        <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
        <psk:MediaSizeWidth xsi:type="xsd:integer" psf2:psftype="ScoredProperty">215900</psk:MediaSizeWidth>
        <psk:MediaSizeHeight xsi:type="xsd:integer" psf2:psftype="ScoredProperty">279400</psk:MediaSizeHeight>
        <psk12:PortraitImageableSize xsi:type="psf2:ImageableAreaType" psf2:psftype="Property">6400,5000,203200,269400</psk12:PortraitImageableSize>
        <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
        <psk:MediaSizeWidth xsi:type="xsd:integer" psf2:psftype="ScoredProperty">105000</psk:MediaSizeWidth>
```

```xml
        <psk:MediaSizeHeight xsi:type="xsd:integer" psf2:psftype="ScoredProperty">235000</psk:MediaSizeHeight>
        <psk12:PortraitImageableSize xsi:type="psf2:ImageableAreaType" psf2:psftype="Property">5600,8000,93800,214300</psk12:PortraitImageableSize>
        <psk12:BorderlessImageableSize xsi:type="psf2:ImageableAreaType" psf2:psftype="Property">0,0,105000,235000</psk12:BorderlessImageableSize>
    </psk:JapanYou4Envelope>
    <psk:NorthAmericaLegal psf2:psftype="Option" psf2:default="false">
        <psk:MediaSizeWidth xsi:type="xsd:integer" psf2:psftype="ScoredProperty">215900</psk:MediaSizeWidth>
        <psk:MediaSizeHeight xsi:type="xsd:integer" psf2:psftype="ScoredProperty">355600</psk:MediaSizeHeight>
        <psk12:PortraitImageableSize xsi:type="psf2:ImageableAreaType" psf2:psftype="Property">6400,5000,203200,345600</psk12:PortraitImageableSize>
        <psk12:BorderlessImageableSize xsi:type="psf2:ImageableAreaType" psf2:psftype="Property">0,0,215900,355600</psk12:BorderlessImageableSize>
    </psk:NorthAmericaLegal>
    <psk:JISB5 psf2:psftype="Option" psf2:default="false">
        <psk:MediaSizeWidth xsi:type="xsd:integer" psf2:psftype="ScoredProperty">182000</psk:MediaSizeWidth>
        <psk:MediaSizeHeight xsi:type="xsd:integer" psf2:psftype="ScoredProperty">257000</psk:MediaSizeHeight>
        <psk12:PortraitImageableSize xsi:type="psf2:ImageableAreaType" psf2:psftype="Property">3400,5000,175200,247000</psk12:PortraitImageableSize>
        <psk12:BorderlessImageableSize xsi:type="psf2:ImageableAreaType" psf2:psftype="Property">0,0,182000,257000</psk12:BorderlessImageableSize>
    </psk:JISB5>
</psk:PageMediaSize>

<!--orientation-requested-default -->
<psk:PageOrientation psf2:psftype="Feature">
    <psk:Portrait psf2:psftype="Option" psf2:default="true"/>
    <psk:Landscape psf2:psftype="Option" psf2:default="false"/>
    <psk:ReverseLandscape psf2:psftype="Option" psf2:default="false"/>
</psk:PageOrientation>

................

<!--finishings-default, finishings-supported -->
<psk:JobStapleAllDocuments psf2:psftype="Feature">
    <psk:None psf2:psftype="Option" psf2:default="true"/>
    <psk:StapleTopLeft psf2:psftype="Option" psf2:default="false"/>
    <psk:StapleTopRight psf2:psftype="Option" psf2:default="false"/>
    <psk:StapleBottomLeft psf2:psftype="Option" psf2:default="false"/>
    <psk:StapleBottomRight psf2:psftype="Option" psf2:default="false"/>
    <psk:StapleDualLeft psf2:psftype="Option" psf2:default="false"/>
    <psk:StapleDualTop psf2:psftype="Option" psf2:default="false"/>
    <psk:StapleDualRight psf2:psftype="Option" psf2:default="false"/>
    <psk:StapleDualBottom psf2:psftype="Option" psf2:default="false"/>
    <psk:SaddleStitch psf2:psftype="Option" psf2:default="false"/>
</psk:JobStapleAllDocuments>

<!--sides-default, sides-supported -->
<psk:JobDuplexAllDocumentsContiguously psf2:psftype="Feature">
<psk:OneSided psf2:psftype="Option" psf2:default="true"/>
<psk:TwoSidedShortEdge psf2:psftype="Option" psf2:default="false"/>
<psk:TwoSidedLongEdge psf2:psftype="Option" psf2:default="false"/>
</psk:JobDuplexAllDocumentsContiguously>

<!--print-color-mode-default, print-color-mode-supported, pwg-raster-document-type-supported -->
    <psk:PageOutputColor psf2:psftype="Feature">
        <psk:Color psf2:psftype="Option" psf2:default="true"/>
        <psk:Grayscale psf2:psftype="Option" psf2:default="false"/>
        <psk:Monochrome psf2:psftype="Option" psf2:default="false"/>
    </psk:PageOutputColor>
</PrintDeviceCapabilities>
```

FIG.7

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%%
Device.ExtensionDesc% = App-Install, %PrinterHardwareId2%%
Device.ExtensionDesc% = App-Install, %PrinterHardwareId3%[

App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_devoce001"
```

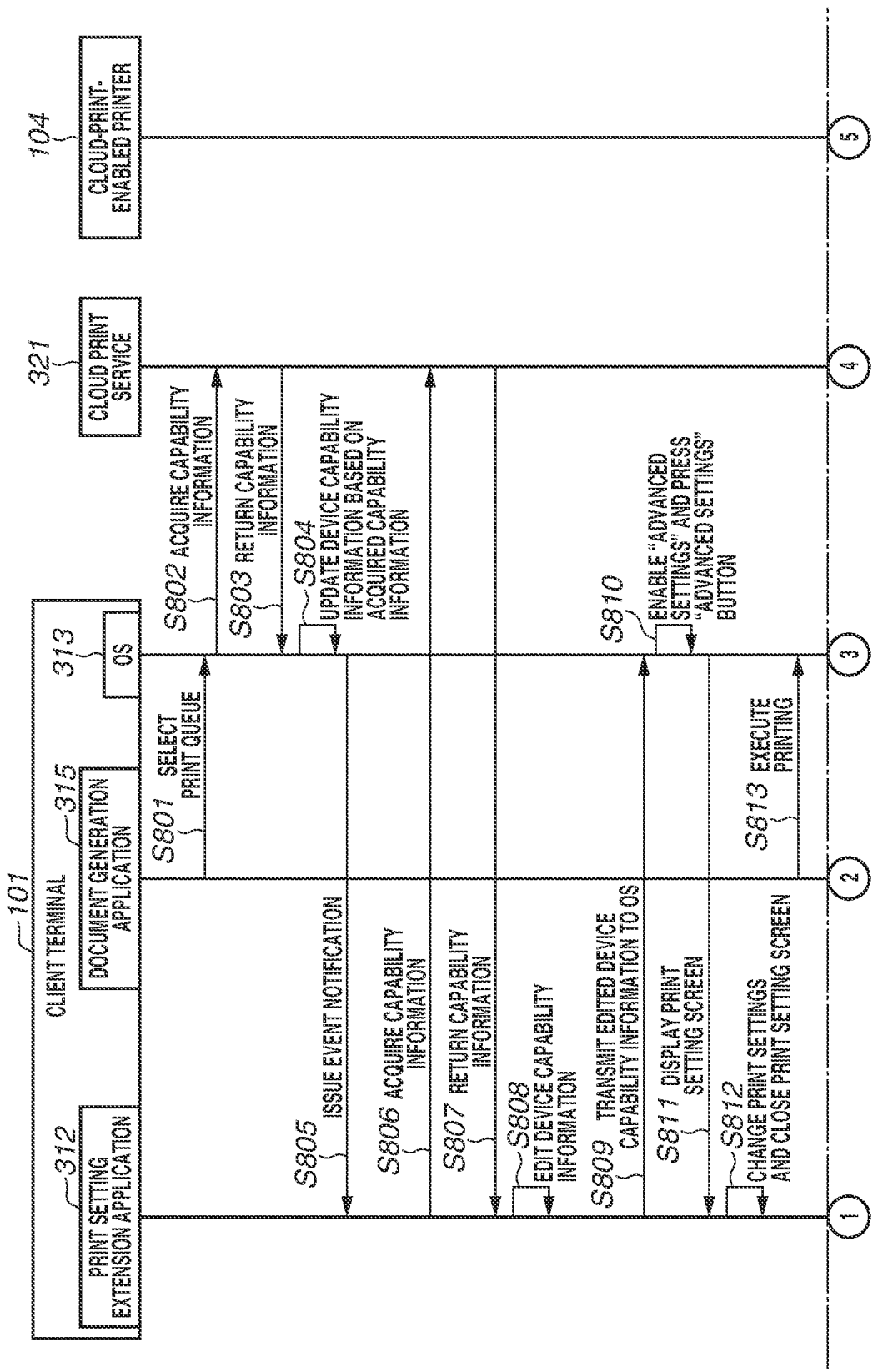

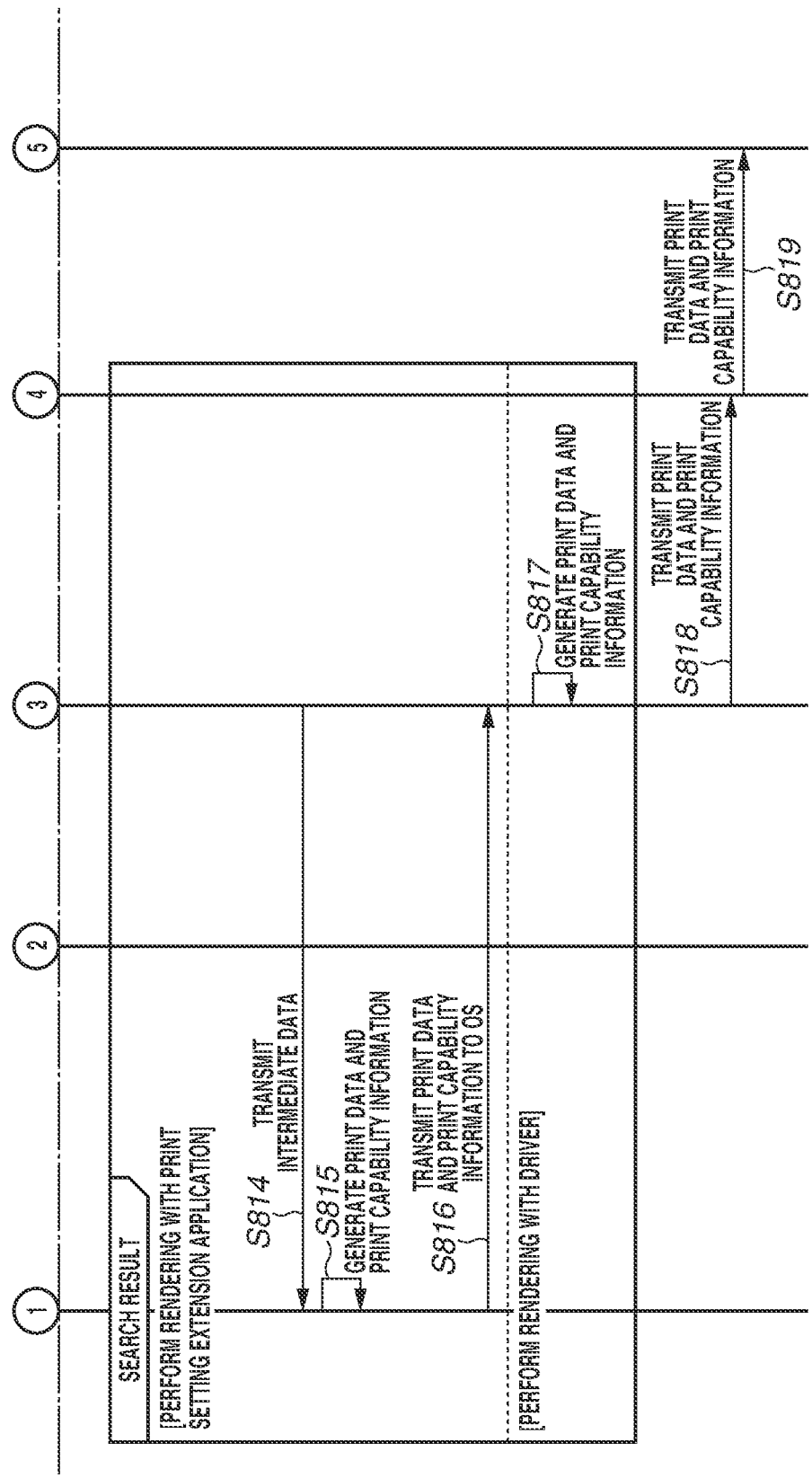

FIG.10A *1001*

OUTPUT SHEET SIZE
[A4 ▼]
SHEET TYPE
[PLAIN PAPER]
NUMBER OF COPIES
[1]
SHEET ORIENTATION
● PORTRAIT ○ LANDSCAPE
PRINT QUALITY
[STANDARD ▼]

*1002* [OK] [CANCEL]

FIG.10B

PRINT IN UNITS OF COPIES
[OFF ▼]
STAPLING
[UPPER LEFT ▼]
PUNCHING
[NONE ▼]
FOLDING SETTING
[NONE ▼]
COLOR MODE
[COLOR ▼]

[OK] [CANCEL]

FIG.10C

N-IN-ONE PRINTING
[2IN1 ▼]
PLACEMENT ORDER
[FROM LEFT TO RIGHT ▼]
MAGNIFICATION
[NONE ▼]
DOUBLE-SIDED PRINTING
[ONE-SIDED ▼]
BINDING DIRECTION
[LONG-EDGE BINDING ▼]

[OK] [CANCEL]

FIG.10D

180-DEGREE ROTATION
[NONE ▼]
STORAGE OF JOBS IN PRINTER
[OFF ▼]
JOB NAME ABBREVIATION
[OFF ▼]

[OK] [CANCEL]

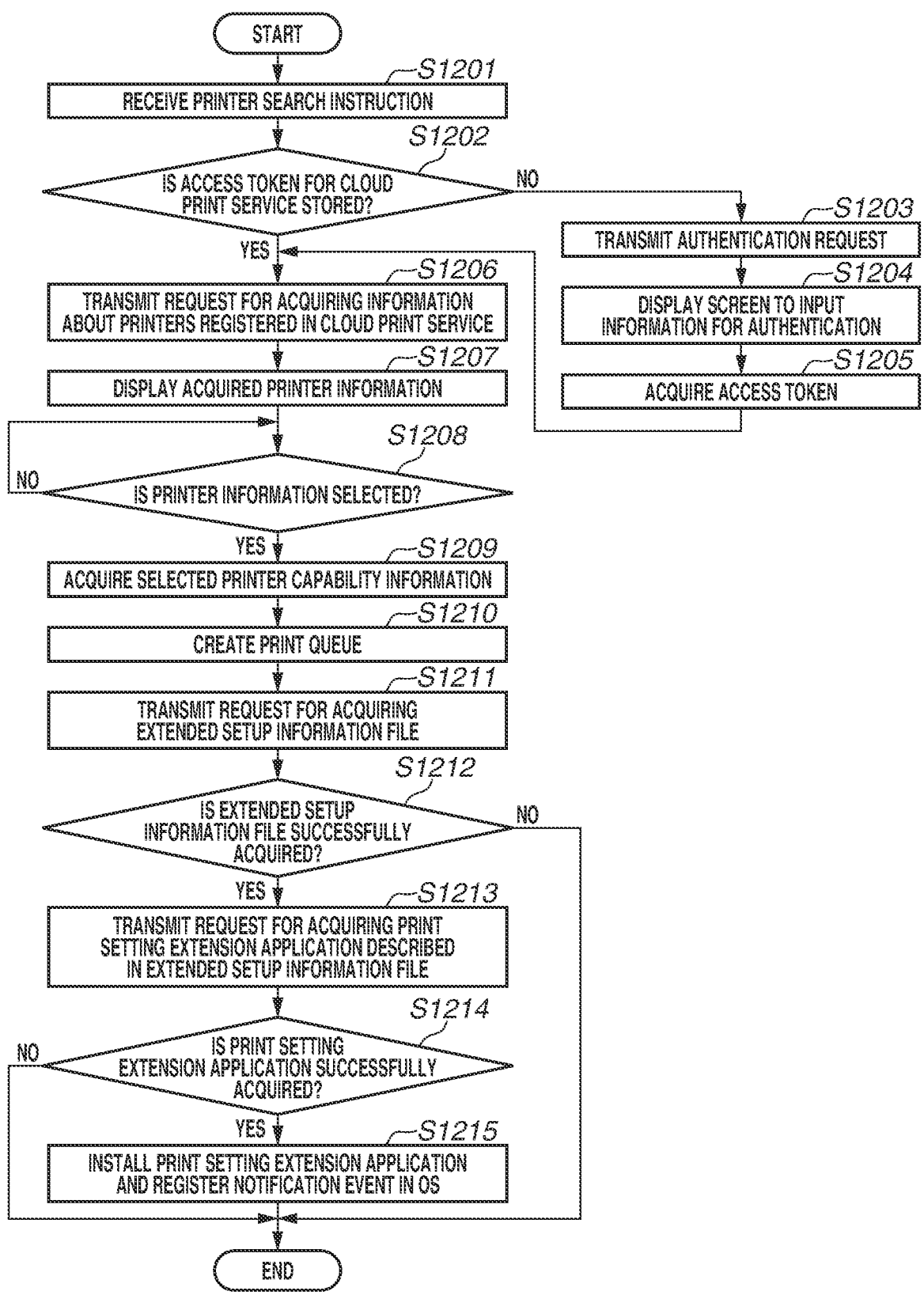

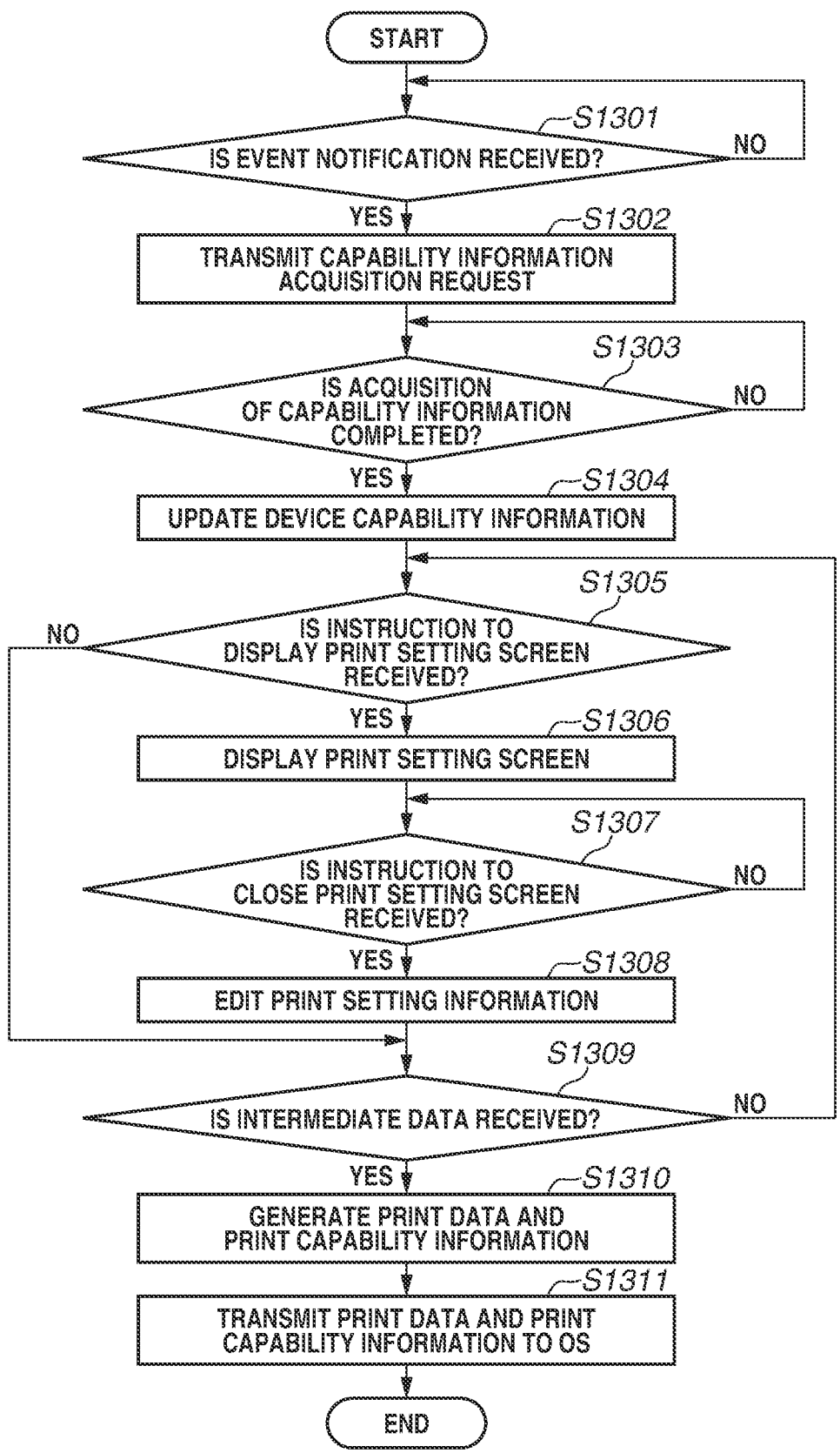

INFORMATION PROCESSING APPARATUS, CONTROL METHOD THEREFOR, AND NON-TRANSITORY COMPUTER-READABLE STORAGE MEDIUM

BACKGROUND

Field of the Disclosure

The present disclosure relates to an information processing apparatus, a control method for the information processing apparatus, and a non-transitory computer-readable storage medium.

Description of the Related Art

A general-purpose printer driver to establish communication using an industry-standard protocol such as an Internet Printing Protocol (IPP) has recently been considered. Examples of the general-purpose printer driver include a local printer driver to be directly connected to a printer, and a cloud printer driver to transmit print data to a cloud print service.

The general-purpose printer driver is configured to communicate with printers of various printer vendors. Accordingly, the use of the general-purpose printer driver enables a user to transmit print data to an image forming apparatus or a cloud print service without the need for installing a printer driver unique to a vendor.

In the general-purpose printer driver that handles print jobs for printing using printers of various vendors, items and functions that can be set as print settings are limited. As discussed in Japanese Patent Application Laid-Open No. 2021-124791, a technique for extending a print queue associated with a printer driver using identification information about a printer associated with the printer driver has been considered. By using this technique, a print setting user interface (UI) and a print job editing function that are unique to a vendor can be implemented.

According to conventional techniques, in the case of using a general-purpose printer driver pre-installed on an operating system (OS), only capability information about setting items preliminarily set in the OS is acquired.

For this reason, even if the printer includes functions uniquely defined by a printer vendor, such as a "stapleless binding" function, a "saddle-fold" function, and a function of "storing jobs in printer", the general-purpose printer driver cannot acquire capability information about these functions from the printer.

Accordingly, the conventional general-purpose printer driver is not capable of displaying, for example, print settings for unique functions depending on the capability of a printer.

SUMMARY

According to embodiments of the present disclosure, an information processing apparatus configured to store information about a printer includes an acquisition unit configured to acquire first capability information defined by a predetermined protocol and second capability information not defined by the predetermined protocol, a display unit configured to display a first object to set a setting value for a first setting item based on the acquired first capability information, and display a second object to set a setting value for a second setting item based on the acquired second capability information, and a transmission unit configured to transmit a first setting value set via the first object and a second setting value set via the second object.

Further features of the present disclosure will become apparent from the following description of exemplary embodiments with reference to the attached drawings.

BRIEF DESCRIPTION OF THE DRAWINGS

FIGS. 2A to 2E are block diagrams illustrating an example of a hardware configuration of an image processing apparatus and an example of a hardware configuration of an image forming apparatus according to the exemplary embodiment.

FIGS. 3A and 3B are a sequence diagram illustrating an example of processing for installing a print setting extension application according to the exemplary embodiment.

FIG. 5 is a diagram illustrating an example of configuration information stored in a cloud-print-enabled printer according to the exemplary embodiment.

FIG. 6A is a diagram illustrating an example of device configuration information included in an operating system (OS) according to the exemplary embodiment.

FIGS. 6B-1 and 6B-2 are a diagram illustrating an example of device configuration information extended with information acquired from a cloud print service according to the exemplary embodiment.

FIG. 7 illustrates an example of an extended setup information file acquired from an online support service according to the exemplary embodiment.

FIGS. 8A and 8B are a sequence diagram illustrating an example of a processing from making a print setting using the print setting extension application up to transmitting print data according to the exemplary embodiment.

FIGS. 10A to 10E are diagrams each illustrating an example of a print setting screen to be displayed in a case where the print setting extension application is installed in the exemplary embodiment.

FIG. 12 is a flowchart illustrating processing for installing the print setting extension application on the client terminal according to the exemplary embodiment.

FIG. 13 is a flowchart illustrating processing for making print settings using the print setting extension application and generating print data according to the exemplary embodiment.

DESCRIPTION OF THE EMBODIMENTS

Exemplary embodiments of the present disclosure will be described below with reference to the drawings.

Figure 1:
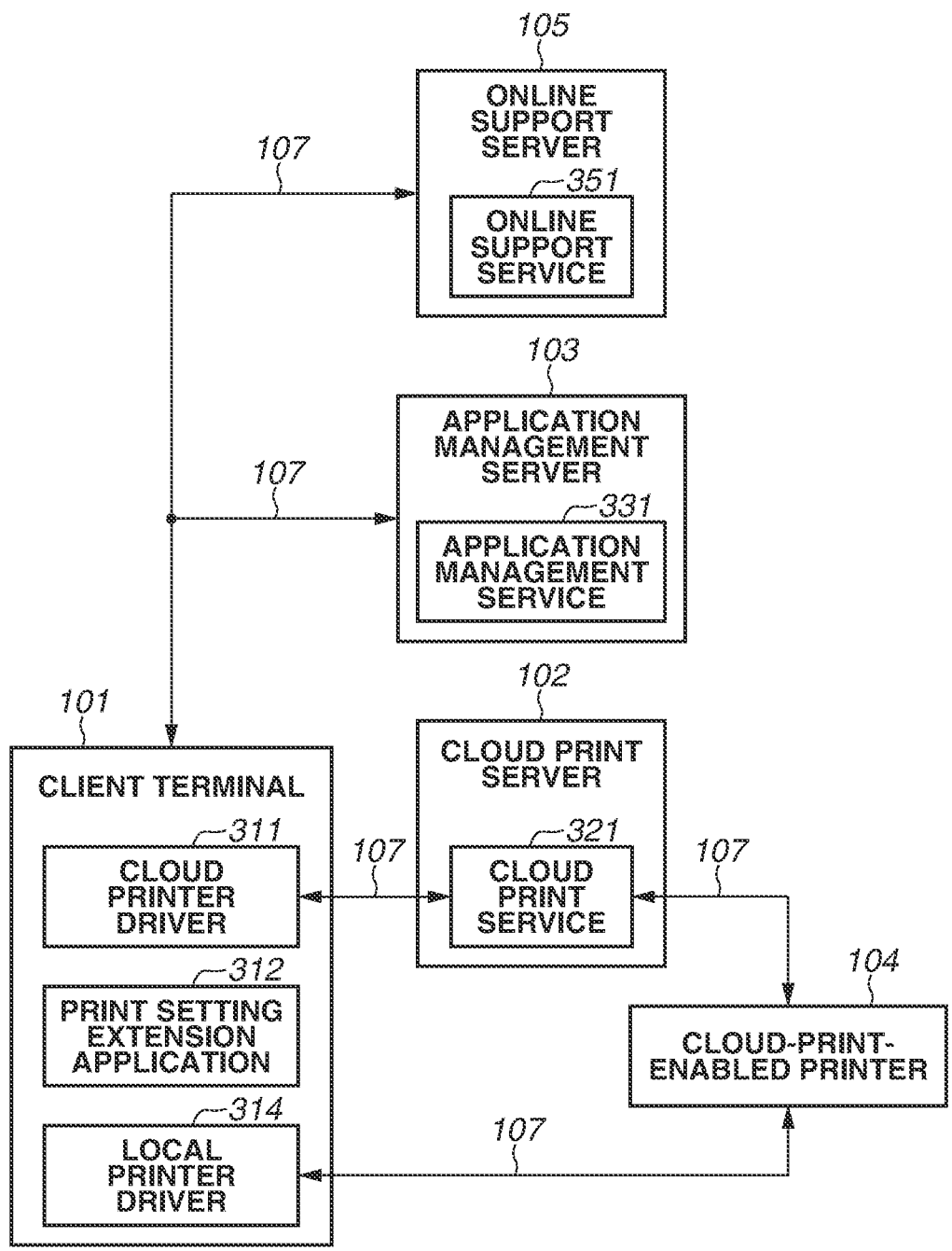
FIG. 1 is a block diagram illustrating an example of a printing system according to an exemplary embodiment of the present disclosure.

FIG. 1 is a block diagram illustrating a configuration example of a printing system for cloud printing according to an exemplary embodiment of the present disclosure. A client terminal 101, a cloud print server 102, an application management server 103, a cloud-print-enabled printer 104, and an online support server 105 are interconnected via a network 107.

While FIG. 1 illustrates a configuration in which one client terminal 101 and one cloud-print-enabled printer 104 are connected, a plurality of client terminals 101 and a plurality of cloud-print-enabled printers 104 may be connected.

Each of the cloud print server 102, the application management server 103, and the online support server 105 may be configured as a server system including a plurality of information processing apparatuses. The configuration in which the cloud print server 102, the application management server 103, and the online support server 105 are each configured as a server system including a plurality of information processing apparatuses makes it possible to distribute a load among the plurality of information processing apparatuses.

The cloud print server 102, the application management server 103, and the online support server 105 may be virtually configured in one physical information processing apparatus.

It is assumed that a wide area network such as the Internet is used as the network 107 to connect to a cloud service, but instead a closed environment such as a corporate local area network (LAN) may be used.

The client terminal 101 is an information processing apparatus such as a personal computer (PC), a tablet, or a smartphone. The client terminal 101 is directly operated by a user. Any application software can be executed on the client terminal 101.

The cloud-print-enabled printer 104 is an image forming apparatus that actually performs printing on a recording medium such as a sheet, converts print data received via the network 107 into image data, and executes printing based on the image data.

The cloud-print-enabled printer 104 can receive print data from the client terminal 101 via the cloud print server 102, and also can directly receive print data from the client terminal 101.

The cloud-print-enabled printer 104 receives print data generated by a cloud printer driver 311 of the client terminal 101 via the cloud print server 102. The cloud-print-enabled printer 104 also receives print data generated by a local printer driver 314 of the client terminal 101 without involving the cloud print server 102.

The cloud print server 102 receives a print instruction and print data from an external apparatus. The cloud print server 102 transmits the received print data to the predetermined cloud-print-enabled printer 104.

The application management server 103 holds and manages various applications.

The application management server 103 receives application identification information and an application download request from the client terminal 101, and transmits an application identified based on the received identification information to the client terminal 101.

The online support server 105 is a server apparatus that provides an online support service 351. The online support service 351 is a server apparatus that provides the client terminal 101 with an extended setup information file in which information for extending the functions of the client terminal 101 is described.

Next, a hardware configuration of the system according to the present exemplary embodiment will be described with reference to FIGS. 2A to 2E.

FIG. 2A is a block diagram illustrating a hardware configuration of the client terminal 101.

The client terminal 101 includes a display unit 216, an operation unit 217, a storage unit 214, a control unit 211, and a network communication unit 215.

The storage unit 214 is a non-volatile storage device such as a hard disk drive (HDD) or a solid-state drive (SSD), and can store and rewrite digital data.

The control unit 211 includes a central processing unit (CPU) 212 and a memory 213, and controls the overall operation of the client terminal 101. The CPU 212 loads programs stored in the storage unit 214 into the memory 213 and executes the programs. The memory 213 is a main storage memory for the CPU 212, and is used as a work area or a temporary storage area for loading various programs.

The network communication unit 215 is a device that communicates with the external network 107, and inputs and outputs digital data to and from an external server, the client terminal 101, and the like via the network 107.

The display unit 216 is a device, such as a liquid crystal display, that displays visual information for the user. The operation unit 217 is a device that receives an input from the user through a keyboard, a mouse, or the like. A device, such as a touch panel, that includes the function of the display unit 216 and the function of the operation unit 217 may also be used.

FIG. 2B is a block diagram illustrating a hardware configuration of the cloud print server 102. The cloud print server 102 includes a storage unit 224, a control unit 221, and a network communication unit 225.

The configurations of the storage unit 224, the control unit 221, and the network communication unit 225 are respectively similar to the configurations of the storage unit 214, the control unit 211, and the network communication unit 215 in the client terminal 101, and thus the descriptions thereof are omitted.

The present exemplary embodiment is described assuming that the cloud print server 102 is formed by one information processing apparatus having the hardware configuration illustrated in FIG. 2B. However, the cloud print server 102 may be formed by a plurality of information processing apparatuses each having the hardware configuration illustrated in FIG. 2B.

FIG. 2C is a block diagram illustrating a hardware configuration of the application management server 103. The application management server 103 includes a display unit 236, an operation unit 237, a storage unit 234, a control unit 231, and a network communication unit 235.

The configurations of the display unit 236, the operation unit 237, the storage unit 234, the control unit 231, and the network communication unit 235 are respectively similar to the configurations of the display unit 216, the operation unit 217, the storage unit 214, the control unit 211, and the network communication unit 215 in the client terminal 101, and thus the descriptions thereof are omitted.

The present exemplary embodiment is described assuming that the application management server 103 is formed by one information processing apparatus having the hardware configuration illustrated in FIG. 2C. However, the application management server 103 may be formed by a plurality of information processing apparatuses.

FIG. 2D is a block diagram illustrating a hardware configuration of the cloud-print-enabled printer 104. The cloud-print-enabled printer 104 includes a display unit 246, an operation unit 247, a storage unit 244, a control unit 241, a network communication unit 245, and a printing unit 248.

The display unit 246 is a device, such as a touch panel and a light-emitting diode (LED), that is mounted on the cloud-print-enabled printer 104. The display unit 246 displays information for the user.

The operation unit 247 is a device that receives an input from the user. The operation unit 247 may include not only the touch panel, but also hardware keys such as a numeric keypad. The configurations of the storage unit 244 and the control unit 241 are respectively similar to the configurations of the storage unit 214 and the control unit 211 in the client terminal 101, and thus the descriptions thereof are omitted.

The network communication unit 245 is a device that communicates with the external network 107, and mainly functions to receive print data and transmit information about the state of the cloud-print-enabled printer 104, such as an error state, to the external server and the like.

The printing unit 248 includes an image forming unit (not illustrated) that forms an image on a sheet conveyed from a cassette or a tray. An image forming method is not particularly limited. For example, an electrophotographic method and an inkjet method may be used. The sheets having the image formed thereon by the image forming unit are conveyed to a finishing device (not illustrated) to perform finishing processing such as stapling or punching processing on the sheets. The present exemplary embodiment is described assuming that the above-described finishing device is also included in the printing unit 248.

While the present exemplary embodiment is described based on an example where a single-function printer that performs only the print function is used as an example of the cloud-print-enabled printer 104, a multi-function printer (multi-function peripheral) including not only the print function, but also a scanner function and a facsimile (FAX) function may also be used.

FIG. 2E is a block diagram illustrating a detailed hardware configuration of the online support server 105. While the present exemplary embodiment is described assuming that the online support server 105 is formed by one information processing apparatus, the online support server 105 may be formed by a plurality of information processing apparatuses. The online support server 105 includes a display unit 256, an operation unit 257, a storage unit 254, a control unit 251, and a network communication unit 255. The configurations of the display unit 256 and the operation unit 257 are respectively similar to the configurations of the display unit 216 and the operation unit 217 in the client terminal 101, and thus the descriptions thereof are omitted. The storage unit 254 is a memory device such as a HDD or SSD. The storage unit 254 stores the extended setup information file in which information for extending the functions provided by the client terminal 101 is described.

The control unit 251 includes a CPU 252 and a memory 253. The CPU 252 controls the overall operation of the online support server 105. The memory 253 is used for processing to be executed by the CPU 252. The network communication unit 255 is an interface for the online support server 105 to communicate with the client terminal 101. The online support server 105 receives a request for acquiring a file stored in the storage unit 254 via the network communication unit 255, and transmits the corresponding file to the client terminal 101.

Next, an example of a user procedure and a sequence between each software and print services according to the present exemplary embodiment will be described with reference to FIGS. 3A and 3B.

First, the cloud-print-enabled printer 104 receives, from the user, a printer registration operation to register the cloud-print-enabled printer 104 with the cloud print service 321. In step S3001, the cloud-print-enabled printer 104 transmits device identification information about the printer and a printer registration request to the cloud print service 321. The device identification information transmitted to the cloud print service 321 in this step is, for example, a hardware identifier (HWID) allocated to each type of printers. Any information may be used as the device identification information, as long as the type of each printer can be identified based on the information.

Upon receiving the registration request, the cloud print service 321 transmits a uniform resource locator (URL) for the cloud print service 321 for printer registration to the cloud-print-enabled printer 104. When the user accesses the URL from the cloud-print-enabled printer 104 or the information processing apparatus, an input screen for inputting a user ID and a password is displayed on the display unit of the terminal that has accessed the URL. The user inputs the user ID and password to use the cloud print service 321, and logs in to the cloud print service 321. When the user's login processing is successful, the cloud print service 321 transmits a request for acquiring information for registering printers to the cloud-print-enabled printer 104. The cloud-print-enabled printer 104 transmits printer information to the cloud print service 321 in response to the request.

Next, the cloud print service 321 that has received the printer registration request registers information about the cloud-print-enabled printer 104, and generates a print queue for the cloud-print-enabled printer 104. In this step, the cloud print service 321 acquires capability information about the cloud-print-enabled printer 104, and associates the capability information with the generated print queue. The capability information refers to information indicating the functions included in the printer and information used for the user to make print settings during printing. Examples of the capability information include information indicating whether double-sided printing is enabled, information indicating whether color printing is enabled, and information indicating whether stapling is enabled.

FIG. 5 illustrates an example of the capability information. The capability information includes item names and attribute values. The item names correspond to setting items for print settings. The attribute values correspond to setting values, options, and ranges that can be set in each setting item. Examples of the item names include item names related to sheets, such as "sheet size" and "sheet type", and item names related to printing, such as "number of copies", "print quality", "color mode", and "N-in-one printing". The capability information also includes items related to a finishing function, such as "stapling", "punching", and "folding setting". The cloud-print-enabled printer 104 stores not only the item names and attribute values defined as industry-standard specifications by an Internet Printing Protocol (IPP), but also the item names and attribute values uniquely defined by a printer vendor. The item names illustrated in FIG. 5, for example, "storage of jobs in printer", "job name abbreviation", and "stapleless binding", and the attribute values respectively associated with the item names correspond to the item names and attribute values uniquely defined by the printer vendor. The setting item "storage of jobs in printer" is used to set whether print data received from the cloud print service 321 is stored in the printer after completion of printing.

The setting item "job name abbreviation" is used to set whether to display an abbreviated name given to the print data when the printer displays bibliographic information about the print data received from the cloud print service 321 on the display unit of the printer. The setting item "stapleless binding" is used to set whether to bind output sheets that are based on the print data received by the printer from the cloud print service 321, without using staples. The stapleless binding refers to binding of sheets, for example, by crimping. The attribute values unique to the printer vendor may be defined as the attribute values respectively corresponding to the item names defined as the industry-standard specifications. For example, the item name "folding setting" is defined by the IPP. The attribute value "saddle-fold", which is one of the attribute values for "folding setting", indicates the function of folding and discharging one or more sheets at once without stapling the sheets, and is one of the attribute values uniquely defined by the printer vendor.

In the present exemplary embodiment, assume that capability information is transmitted to the cloud print service 321 based on the IPP as a communication protocol. The cloud-print-enabled printer 104 registers capability information using commands prepared for the cloud-print-enabled printer 104 to register the capability information with the cloud print service 321. The cloud-print-enabled printer 104 provides the cloud print service 321 with the item names illustrated in FIG. 5, attribute values respectively corresponding to the item names, and default values. Any capability information can be provided regardless of whether the items and attribute values are defined by the IPP. For example, the cloud print service 321 is provided with the item names "storage of jobs in printer", "job name abbreviation", and "stapleless binding" illustrated in FIG. 5, and the attribute values respectively corresponding to the item names. The attribute value "saddle-fold", which is one of the attribute values for "folding setting" and is unique to the printer vendor, is also registered with the cloud print service 321 as one of the attribute values for "folding setting".

Next, installation of a print setting extension application 312 when the user performs a setup operation for printing in the cloud-print-enabled printer 104 on the client terminal 101 will be described. In the case of registering the cloud-print-enabled printer 104 with the client terminal 101, a standard print function that is one of the functions of an operating system (OS) 313 of the client terminal 101 is used.

Figure 4:
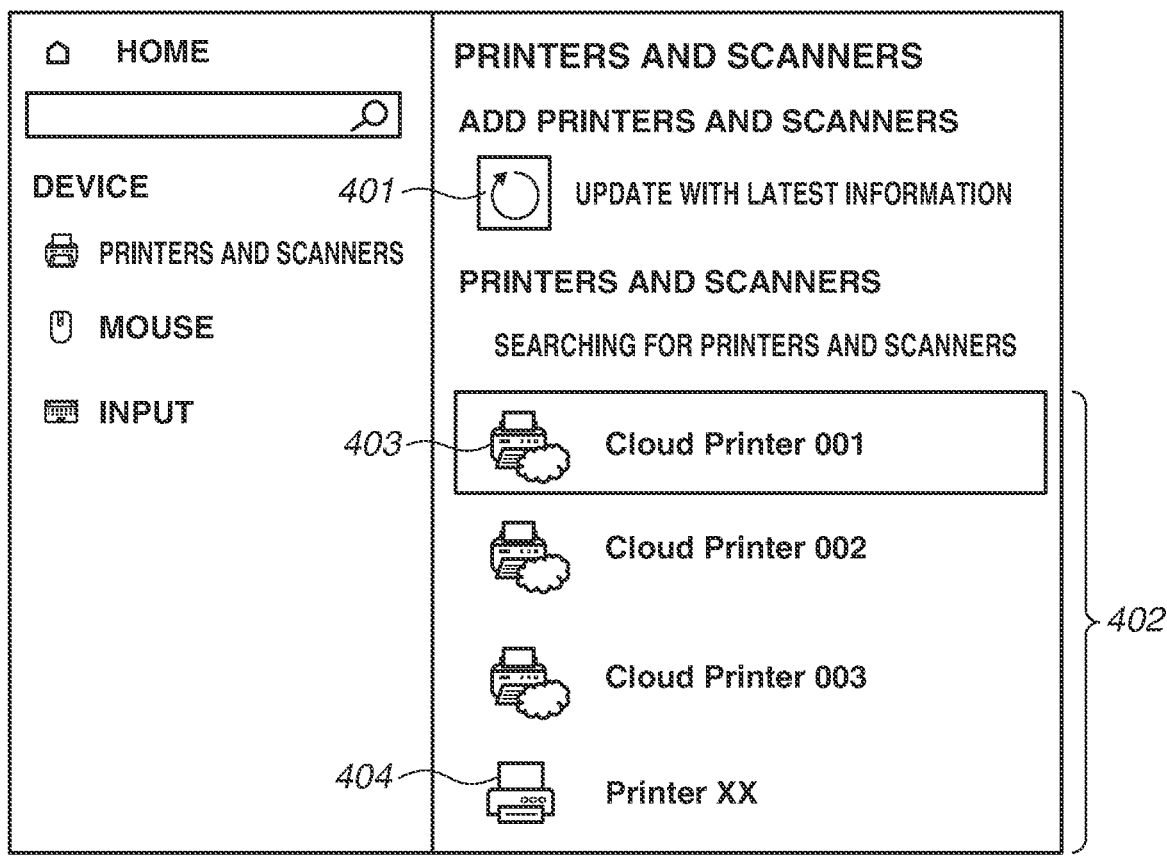
FIG. 4 is a diagram illustrating an example of a screen to be displayed on a client terminal according to the exemplary embodiment.

In step S3002, the OS 313 of the client terminal 101 receives a printer addition operation performed by the user as a setup operation for the cloud-print-enabled printer 104. For example, the following operation is performed as the setup operation for the cloud-print-enabled printer 104. FIG. 4 illustrates a screen for printers registered in the client terminal 101, and the screen is displayed by the OS 313 of the client terminal 101. When the user selects an object 401, a printer search instruction is input to the OS 313.

The OS 313 that has received the printer search instruction determines whether a token for the cloud print service 321 is held. If the token is not held in the OS 313, the OS 313 displays a screen for inputting user information (login name, password) (not illustrated). In step S3003, the OS 313 of the client terminal 101 transmits the user information input via the screen to the cloud print service 321 to request for user authentication and an access token.

In step S3004, the cloud print service 321 performs authentication processing using the user information received from the client terminal 101. Upon completion of the authentication processing, the cloud print service 321 notifies the client terminal 101 of the result of authentication processing.

If the user authentication is successful in step S3004, then in step S3005, the OS 313 of the client terminal 101 acquires the access token from the cloud print service 321.

If the user authentication is unsuccessful in step S3004, then in step S3006, the cloud print service 321 issues an authentication error notification to the OS 313 of the client terminal 101. In step S3007, the OS 313 of the client terminal 101 cancels the processing based on the received authentication error information. If the access token cannot be acquired, the OS 313 of the client terminal 101 terminates the processing illustrated in FIGS. 3A and 3B.

If the access token is held in the OS 313, or if the token is acquired in step S3005, the processing proceeds to step S3008. The OS 313 searches for printers registered in the cloud print service 321 and printers connected to the network 107.

In step S3008, the OS 313 of the client terminal 101 transmits a request for acquiring printer information registered in the cloud print service 321 to search for printers. In step S3008, the OS 313 of the client terminal 101 transmits the printer information acquisition request with the access token to the cloud print service 321.

In step S3009, the cloud print service 321 transmits information about printers that are allowed to be used by the user identified based on the access token attached to the acquisition request, to the client terminal 101. The printer information transmitted to the client terminal 101 in step S3009 includes a printer name given to each printer registered with the cloud print service 321, and the HWID of the printer.

The OS 313 of the client terminal 101 acquires a printer list transmitted from the cloud print service 321 and the device identification information about each printer. In parallel with the processing of steps S3008 and S3009, the OS 313 of the client terminal 101 searches for printers connected to the same network as that of the client terminal 101. This is a device search using multicast domain name system (mDNS), Bonjour, or the like.

The OS 313 displays the printer list on the client terminal 101 based on the printer information acquired from the cloud print service 321 and the printer information detected in the search on the network 107. A list of printer information received from the cloud print service 321 is displayed on an area 402 illustrated in FIG. 4. In the information displayed on the area 402, "Cloud Printer 001/002/003" is information about the printers registered in the cloud print service 321. On the other hand, "Printer XX" indicates the printer detected by the client terminal 101 in the search on the network 107. Thus, the printer information acquired from the cloud print service 321 and the information about the printer detected in the search on the network 107 are displayed as a list. The printer information received from the cloud print service 321 is displayed with an icon 403 added thereto. On the other hand, the information about the printer detected in the search on the network 107 is displayed with an icon 404 added thereto. With this configuration, the printer information received from the cloud print service 321 and the printer information detected in the search on the network 107 can be displayed in a distinguishable manner. Only the printer information registered with the cloud print service 321 may be displayed on the client terminal 101.

Next, the user selects printer information corresponding to the printer to be registered with the client terminal 101 from the printer information displayed on the area 402.

In step S3010, the OS 313 of the client terminal 101 inquires about the printer capability information corresponding to the selected printer information to the cloud print service 321. The setting items on which the OS 313 of the client terminal 101 inquires about capability information is defined in the specifications of the OS 313 and is set in the OS 313. The OS 313 of the client terminal 101 designates the setting items stored in advance and inquires about the capability information. The items preliminarily set by the OS 313 are setting items defined as standard specifications by the IPP. Examples of the items include "sheet size", "sheet type", and "color mode".

In step S3011, the cloud print service 321 returns the capability information about the cloud-print-enabled printer 104 to the OS 313 of the client terminal 101.

The present exemplary embodiment is described assuming that the information registered with the cloud print service 321 during the registration processing in step S3001 is transmitted to the client terminal 101 in step S3011. However, the capability information registered with the cloud print service 321 may be transmitted to the client terminal 101 at a timing other than the above-described timing. For example, the capability information registered with the cloud print service 321 may be transmitted to the client terminal 101 when the capability information about the cloud-print-enabled printer 104 is changed. The user may issue an instruction to update the capability information on a user interface (UI) provided by the cloud print service 321, and the capability information updated in response to the instruction may be transmitted to the client terminal 101. The cloud print service 321 may acquire the capability information from the cloud-print-enabled printer 104 at the timing of step S3010, and may issue a notification about the acquired capability information to the client terminal 101.

In step S3011, the cloud print service 321 returns the attribute values corresponding to the setting items designated by the client terminal 101 and the default values. In this case, the attribute values that the cloud print service 321 returns to the client terminal 101 are all attribute values registered with the cloud print service 321, regardless of whether the attribute values are defined as standard specifications. The default values are initially set values when the client terminal 101 displays a print setting screen. If the response to the attributes about which the OS 313 of the client terminal 101 has inquired is not stored, the cloud print service 321 does not respond to the OS 313.

Next, the OS 313 starts to install the cloud printer driver 311 based on the device identification information and printer name of the printer selected by the user.

In step S3012, the OS 313 generates a print queue for the cloud printer driver 311 including the basic device capability information included in the OS 313. The device capability information refers to definition information used for generating print setting capability information about the printer driver. The device capability information is, for example, information described by an extended markup language (XML) such as "PrintDeviceCapabilities". FIG. 6A illustrates an example of default device capability information included in the OS 313. For example, "Feature" indicates the setting item "PageMediaSize" representing the sheet size. "Option" indicates the option corresponding to "PageMediaSize". As default values for the device capability information, there are only two options, i.e., "A4" and "Letter", as illustrated in FIG. 6A. This information is associated with a print queue when the print queue is generated, and the information associated with the print queue is stored and managed by the OS 313. The default device capability information is fixed device capability information, regardless of the information about the connected printer.

After that, the OS 313 updates the device capability information about the cloud printer driver 311 using the capability information acquired from the cloud print service 321. FIGS. 6B-1 and 6B-2 illustrate an example of device capability information updated with the capability information acquired from the cloud print service 321. For example, with respect to "PageMediaSize" representing the sheet size, "Option" other than "A4" and "Letter" is added as options for the sizes of sheets that can be printed by the cloud-print-enabled printer 104. In such a manner, the client terminal 101 first registers the cloud printer driver 311 and the device capability information included in the OS 313 in the print queue in an associated manner. After that, the device capability information associated with the print queue is updated with the capability information acquired from the cloud print service 321. In this case, the OS 313 updates the device capability information using only the attribute values defined as the industry-standard specifications in the capability information acquired from the cloud print service 321. Accordingly, for example, even when the attribute value unique to the vendor is acquired as the sheet type in the acquisition of the capability information, the attribute value unique to the vendor is not added to the device capability information.

The above-described configuration makes it possible to set the print setting values that cannot be set based on the device capability information included in the OS 313.

Thus, the installation of the cloud printer driver 311 is completed. The above-described processing enables the client terminal 101 to transmit print data to the print queue for the cloud-print-enabled printer 104 created in the cloud print service 321.

Next, the OS 313 starts processing to install the application that is associated with the printer and is used to extend the cloud printer driver 311.

First, the OS 313 performs processing of adding additional identification information to the device identification information. This processing is performed to acquire an extended setup information file 700 from the online support server 105, and a character string different from normal device identification information may be used for the additional identification information. In the present exemplary embodiment, to distinguish the application from applications for other devices, the OS 313 adds additional identification information ("PrinterApp_") indicating the application for the printer to the device identification information. "PrinterApp_" is merely an example, and other character strings, numbers, or symbols may be used. As a result of the processing, for example, if the device identification information of the cloud-print-enabled printer 104 indicates "device001", "PrinterApp_device001" is obtained as device identification information after the additional identification information adding processing.

In step S3013, the OS 313 transmits a request for searching the extended setup information file 700 including the target device identification information with additional identification information added thereto, to the online support service 351. In step S3013, a notification about "PrinterApp_devoce001" to which the additional identification information is added is issued to the online support service 351.

The online support service 351 stores the extended setup information file illustrated in FIG. 7. FIG. 7 illustrates an example of the extended setup information file 700. The extended setup information file is created by the vendor of the cloud-print-enabled printer 104 and is registered with the online support service 351.

In the extended setup information file 700, an application identifier for identifying the print setting extension application 312 used for setting print data to be transmitted to the cloud-print-enabled printer 104 is described. In the extended setup information file illustrated in FIG. 7, the item "PackageFamilyName" indicates the identification information about the print setting extension application 312. As "PrinterHardwareID", the character string obtained by adding additional identification information to the identification information about the cloud-print-enabled printer 104 is described.

The online support service 351 stores not only the extended setup information file in which the identification information about the print setting extension application 312 is described, but also the extended setup information in which the identification information about the printer driver is described. In the extended setup information file in which the identifier for the printer driver is described, the identifier for the printer driver is described as "PackageFamilyName". As "PrinterHardwareId" in the extended setup information file, the device identification information including no additional identification information is described.

Thus, the online support service 351 stores both the extended setup information file in which the identifier for the printer driver is described and the extended setup information file in which the identifier for the print setting extension application 312 is described. Accordingly, the additional identification information is added to the device identification information so that the OS 313 can acquire the desirable extended setup information file, as needed.

The online support service 351 that has received the search request identifies the extended setup information file including "PackageFamilyName" matching the device identification information with the additional identification information designated in the request.

As a result of search, if the extended setup information file 700 including the target device identification information is stored in the online support service 351, then in step S3014, the online support service 351 returns the extended setup information file 700 to the OS 313. In this case, the content of the extended setup information file 700 is written into a registry of the OS 313.

Next, in step S3015, the OS 313 installs extended setup information written in the extended setup information file acquired from the online support service 351, in association with the print queue generated in step S3012.

Next, in step S3016, the OS 313 extracts an application ID from the installed extended setup information. The application ID is an identifier defined by "PackageFamilyName" in the extended setup information file. The above-described processing is processing to be performed when the extended setup file corresponding to the cloud-print-enabled printer 104 is stored in the online support service 351.

As a result of search, the extended setup information file 700 including the target device identification information cannot be detected by the online support service 351 in some cases. In such cases, in step S3017, the OS 313 completes the installation of the cloud printer driver 311 and cancels the application installation processing. The OS 313 executes the processing in step S3017 when the extended setup information file cannot be received within a predetermined period from the search request in step S3013, or when an error notification is received from the online support service 351.

In step S3018 and subsequent steps, processing to be performed when the extended setup information file can be acquired and the application ID can be extracted in step S3016 is described.

In step S3018, the OS 313 requests an application management service 331 to search for an application matching the extracted application ID. The application management service 331 stores the application running on the client terminal 101 and the application ID as the identifier for the application in an associated manner. The application and the application ID are registered with the application management service 331 by the vendor that provides the cloud-print-enabled printer 104.

If the application management service 331 holds the print setting extension application 312 matching the requested application ID, then in step S3019, the application management service 331 returns the print setting extension application 312 to the client terminal 101. The print setting extension application 312 to be returned in this step is the application provided with the same ID as the transmitted application ID.

In step S3020, the OS 313 installs the acquired print setting extension application 312 in association with the print queue on the client terminal 101. The OS 313 stores the application ID as information about the print queue in the registry. The print setting extension application 312 sets the OS 313 such that the OS 313 issues an event notification at a timing that the print queue associated with the application is set on the print setting screen. After the client terminal 101 is powered on and the OS 313 is started, the installed print setting extension application 312 is started. After that, the print setting extension application 312 operates as a background task.

If the print setting extension application 312 that matches the requested application ID is not held in the application management service 331, then in step S3021, the OS 313 cancels the application installation processing. In this case, the generated print queue and the cloud printer driver 311 are installed in an associated manner, and the processing is terminated without associating the print setting extension application 312 with the print queue.

The description has been given above of a case where a predetermined character string is added to the device identification information about the cloud-print-enabled printer 104 to search for the extended setup information file. If the file for installation of the printer driver is distinguishable, the search processing may be performed without adding the predetermined character string.

Next, an example of a user procedure and a sequence between each software and a print service according to the present exemplary embodiment will be described with reference of FIGS. 8A and 8B.

The document generation application 315 is, for example, an application for creating document data, an application for creating presentation material, or an application for displaying photographs and image data.

The document generation application 315 displays a print setting screen (FIG. 11) to select a print queue as a print setting initial screen. In the present exemplary embodiment, the document generation application 315 displays the print setting initial screen, but instead the OS 313 may display a screen similar to the print setting initial screen. An object 1101 for selecting a print queue, an object 1102 for making various print settings, and a print preview image 1103 are displayed on the print setting initial screen.

In step S801, the OS 313 selects a print queue associated with a printer set as a default printer. In the present exemplary embodiment, assume that the cloud-print-enabled printer 104 is selected as the default printer. The processing of step S801 and subsequent steps is executed also when the user changes the printer to be used by operating the object 1101.

Next, in step S802, the OS 313 inquires about capability information about the cloud-print-enabled printer 104 for the queue on the cloud corresponding to the cloud-print-enabled printer 104 of the cloud print service 321. The setting items on which the OS 313 inquires about capability information are preliminarily defined in the specifications of the OS 313. Accordingly, the capability information acquired at this timing is similar to that acquired in step S3001 illustrated in FIG. 3A. The inquiry is issued to the cloud-print-enabled printer 104 using commands of standard protocols defined by the IPP, such as "Get-print-Attributes". In the case of using "Get-print-Attributes", the capability information determined by the OS 313 is inquired in a list format.

In step S803, the cloud print service 321 returns the capability information about the cloud-print-enabled printer 104 in the list of the capability information transmitted using Get-print-Attributes to the OS 313. For example, assume that attributes for the media size are designated by Get-print-Attributes (IPP). If the cloud print service 321 holds the attributes for the media size, the cloud print service 321 returns values (A4, B5, Letter, etc.) associated with the attributes. If the attributes designated by Get-print-Attributes are not included in the queue for the cloud-print-enabled printer 104, the cloud print service 321 does not return any associated values. The capability information acquired in step S803 is capability information about which the OS 313 inquires, regardless of the type or capability of the connected printer.

The OS 313 updates the device capability information using the capability information acquired from the cloud print service 321. In step S804, the OS 313 adds the capability information acquired in step S803 illustrated in FIG. 8A to the device capability information generated in step S3012 illustrated in FIG. 3B. If there is any update of the device capability information, the device capability information managed by the client terminal 101 can be updated by performing the processing in step S803. In the processing of updating the device capability information in step S804, the device capability information is updated only on the attribute values defined in the industry-standard specifications.

Next, in step S805, the OS 313 issues a notification about an event and an application programming interface (API) used to edit device capability information to the print setting extension application 312. The timing when the notification about the event is issued is registered when the print setting extension application 312 is installed on the OS 313 of the client terminal 101.

Upon receiving the event, the print setting extension application 312 sends a request for acquiring capability information to the cloud print service 321. In this capability information acquisition processing, capability information used to write setting items and attribute values that are uniquely defined by the printer vendor into the device capability information is acquired.

Upon receiving the event from the OS 313, in step S806, the print setting extension application 312 inquires about the capability information about the cloud-print-enabled printer 104 via the cloud print service 321. In this step, the print setting extension application 312 sends an inquiry about the capability information on the setting items unique to the printer vendor and the capability information on the setting items including attribute values unique to the printer vendor to the cloud print service 321. Like in step S802 illustrated in FIG. 8A, the inquiry is made using "Get-print-Attributes" and the capability information is acquired by designating the item names of the setting items about which the print setting extension application 312 inquires. The present exemplary embodiment is described assuming that the capability information on the setting items uniquely defined by the printer vendor or on the setting items including attribute values uniquely defined by the printer vendor is acquired in step S806. Alternatively, the capability information on setting items already acquired in the capability information acquisition processing performed by the OS 313 may also be acquired.

Upon receiving the inquiry about the unique capability information from the print setting extension application 312, in step S807, the cloud-print-enabled printer 104 responds to the print setting extension application 312 via the cloud print service 321. The responding method used in this step is similar to that used in step S3011 illustrated in FIG. 3B described above. In the present exemplary embodiment, in step S807, the cloud print service 321 returns the capability information about the cloud-print-enabled printer 104 stored in the cloud print service 321. In response to request in step S806, the cloud print service 321 may acquire capability information again from the cloud-print-enabled printer 104, and return the capability information to the client terminal 101.

Upon acquiring the capability information from the cloud-print-enabled printer 104, the print setting extension application 312 edits the device capability information managed by the OS 313 using a configuration information object. The configuration information object is a data set used for editing the device capability information. The print setting extension application 312 cannot directly edit the device capability information included in the OS 313. Accordingly, the device capability information included in the OS 313 is changed using this configuration information object. In step S808, the capability information, such as "stapleless binding" and "storage of jobs in printer", that are acquired in step S807 illustrated in FIG. 8A is converted into device capability information and the device capability information is added to the configuration information object, thereby editing the device capability information. Upon completion of the processing up to step S808, not only the capability information on the standard setting items acquired in the inquiry by the OS 313, but also the setting items and attribute values that are uniquely defined by the printer vendor are stored.

Next, in step S809, the print setting extension application 312 transmits the edited device capability information to the OS 313. The OS 313 stores the device capability information acquired from the print setting extension application 312 and the print queue in an associated manner.

When the OS 313 updates the device capability information, then in step S810, an object used as a trigger to display an UI for the print setting extension application 312 is enabled. The object used as a trigger to display the UI for the print setting extension application 312 is, for example, an object 1104 illustrated in FIG. 11. Before the processing in step S810 is completed, the object 1104 is grayed out, and thus a print setting screen for the print setting extension application 312 is not displayed even when the user clicks the object 1104. After the processing in step S810 is completed, the gray-out of the object 1104 is canceled so that the user can select the object 1104.

When the user selects the object 1104, then in step S811, the print setting extension application 312 is started to display a print setting screen (hereinafter also referred to as an extended print setting screen) as illustrated in FIGS. 10A to 10E. This print setting screen is independent of the type of the document generation application 315 to be used.

Figure 9A:
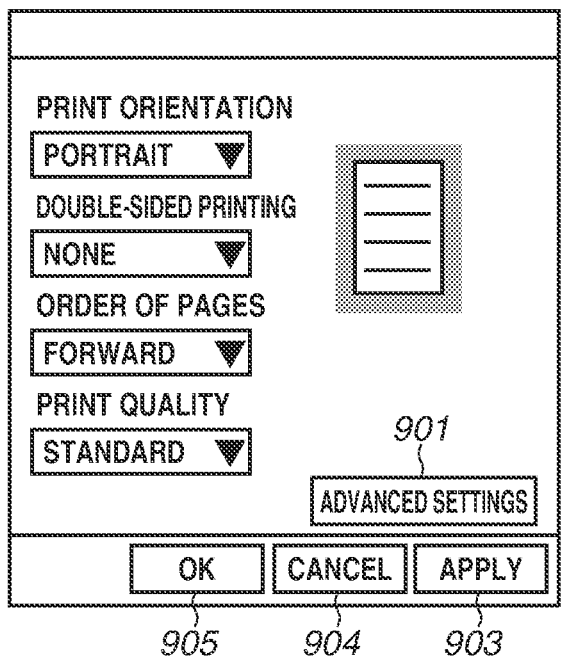
FIGS. 9A to 9D are diagrams each illustrating an example of a print setting screen to be displayed in a case where the print setting extension application is not installed in the exemplary embodiment.
Figure 9B:
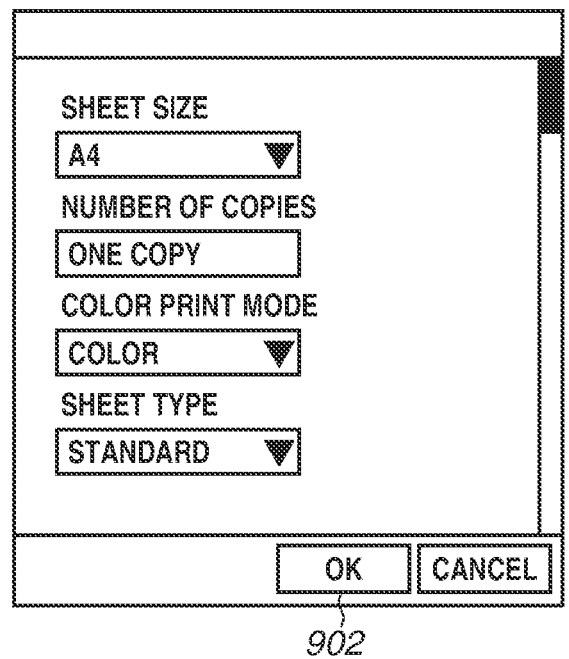
Figure 9C:
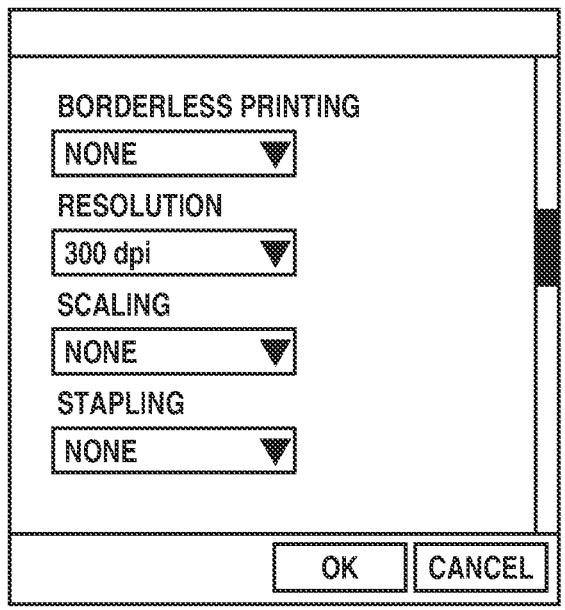
Figure 9D:
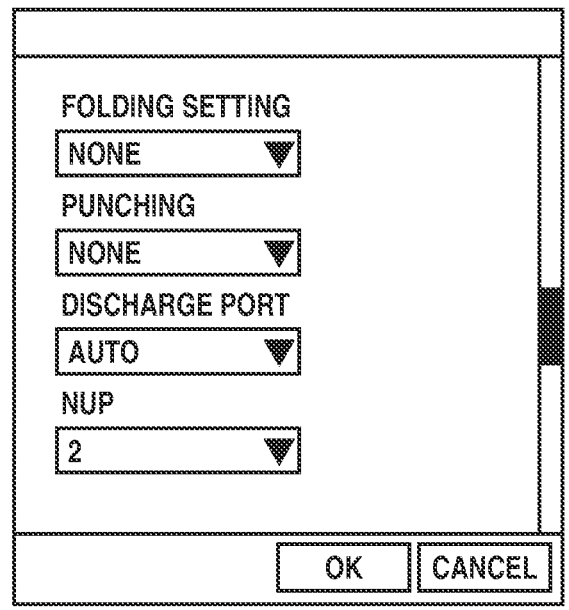
Figure 10E:
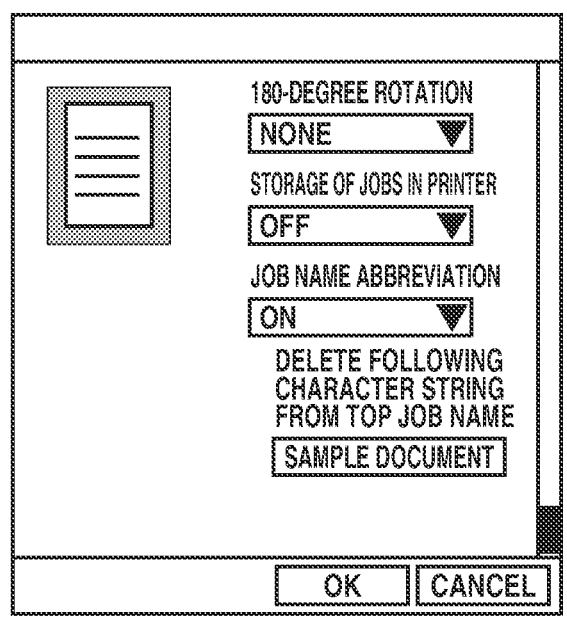

If the print setting extension application 312 is not associated with the selected print queue, a standard print setting screen pre-installed on the OS 313 as illustrated in FIG. 9A is displayed. On the standard print screen, an advanced settings button 901 is pressed to display an advanced print setting screen illustrated in FIG. 9B. The advanced print setting screen is a screen for setting the setting items that cannot be displayed on the standard print setting screen illustrated in FIG. 9A. The advanced print setting screen illustrated in FIG. 9B can be scrolled by operating a scrollbar. Settings can be made on a plurality of print setting items supported by the OS 313 as illustrated in FIGS. 9C and 9D. An OK button 902 is selected to store the current print settings and return to the screen illustrated in FIG. 9A. An "apply" button 903 illustrated in FIG. 9A is used to store the print settings. A cancel button 904 is used to return to the screen illustrated in FIG. 11 without storing the print settings. When an OK button 905 is selected, the print settings are stored and the screen returns to the screen illustrated in FIG. 11. On the screens illustrated in FIGS. 9A to 9D, the print setting items and attribute values that are uniquely defined by the printer vendor cannot be set.

The description returns to the print setting extension application 312. The print setting extension application 312 receives print setting information generated based on the print setting capability information generated by the OS 313 based on the device capability information, and displays the extended print setting screen illustrated in FIG. 10A. The extended print setting screen can be scrolled by operating a scrollbar as illustrated in FIGS. 10A to 10E, and setting values for various print setting items can be made.

For example, an output sheet size indicated by a setting item 1001 illustrated in FIG. 10A is print setting information generated based on "psk:PageMediaSize" illustrated in FIGS. 6B-1 and 6B-2. Additionally, the print setting extension application 312 generates an option "A4" for the output sheet size based on print setting information "psk:IOSA4", and displays the generated option. In this manner, the print setting extension application 312 converts the device capability information into setting values and displays the extended print setting screen. The extended print setting screen is generated based on the device capability information including capability information on the setting items unique to the printer vendor. Therefore, the extended print setting screen enables the user to set the setting items and setting values that cannot be set on the screens of FIGS. 9A to 9D that are provided by the OS 313.

Figure 11:
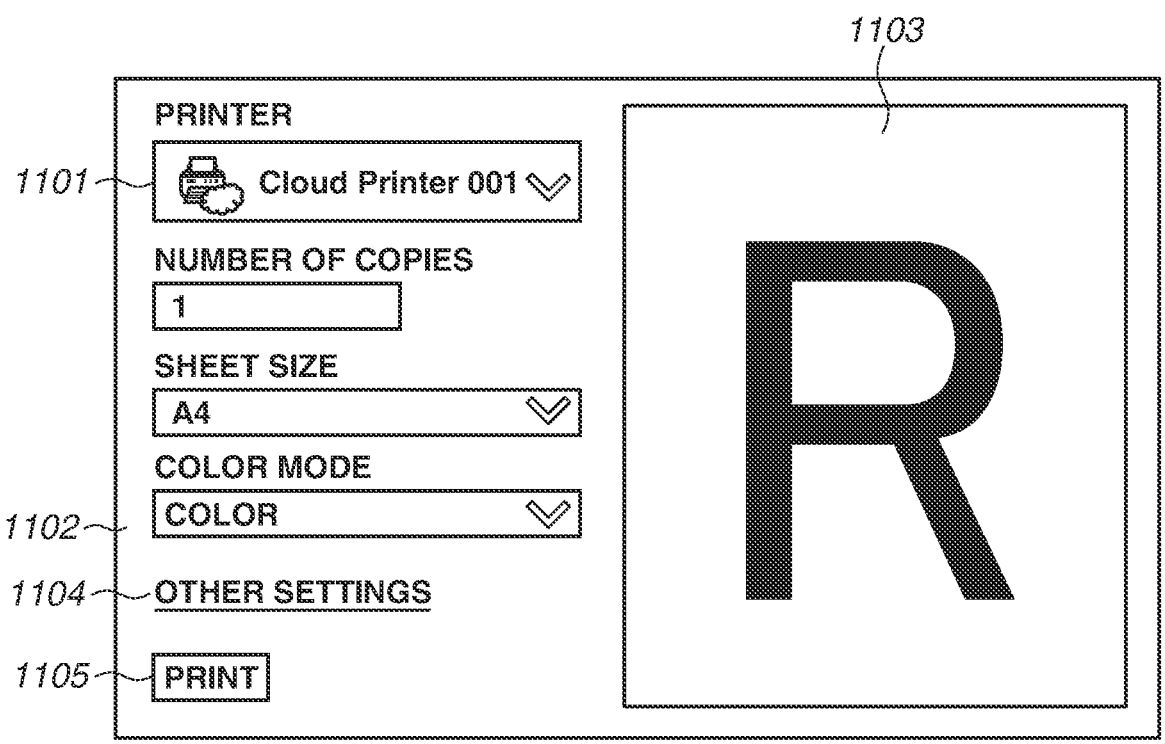
FIG. 11 is a diagram illustrating an example of a print setting screen to be displayed by a document generation application in the exemplary embodiment.

The user selects an object 1002 on the screen illustrated in FIGS. 10A to 10E to display the print setting extension application 312. The object 1002 is an object for fixing the print settings. The print setting extension application 312 provides a function that enables the user to change print settings as needed. If the print settings are changed, the print setting extension application 312 stores the changed setting values. For example, assume that the user has changed the media size from "A4" to "Letter" on the UI. In this case, the print setting information held in the print setting extension application 312 is changed from "A4" to "Letter". When the object 1002 is selected, the print setting extension application 312 acquires print setting information processed in control of the print setting screen from the print setting screen, and transmits the print setting information to the OS 313. After transmitting the print setting information to the OS 313, in step S812, the print setting extension application 312 closes the print setting screen illustrated in FIGS. 10A to 10E. Upon completion of the processing in step S812, the print setting screen illustrated in FIG. 11 is displayed. The print setting screen to be displayed at this time is a screen on which the setting values are set by the print setting extension application 312.

When the user selects an object 1105 on the screen illustrated in FIG. 11, a print instruction is input to the OS 313. In step S813, the OS 313 executes processing associated with printing based on the instruction input via the document generation application 315.

When an instruction to execute printing is issued, then in step S814, the OS 313 generates intermediate data and transmits the generated intermediate data and the print setting information edited on the print setting screen to the print setting extension application 312. The intermediate data is data generated before being converted into print data such as page-description language (PDL) data. The intermediate data is, for example, extended markup language paper specification (XPS) data. The print setting information is also included in the intermediate data.

Upon receiving the intermediate data and print setting information from the OS 313, in step S815, the print setting extension application 312 generates print data based on the intermediate data and also generates print capability information based on the print setting information. The print data is, for example, PDL data such as a portable document format (PDF) file. The print capability information is specifically information in which print setting information is described with attribute values defined by the IPP.

In step S816, the print setting extension application 312 generates the print data, and then transmits the generated print data and the print capability information to the print queue in the OS 313.

The processing of steps S814 to S816 is processing to be performed when the print setting extension application 312 associated with the print queue is installed on the client terminal 101. If the print setting extension application 312 is not installed on the client terminal 101, the client terminal 101 executes processing to be described below in step S816. In step S817, the OS 313 generates XPS data, edits a page layout, converts the XPS data into a predetermined format, and generates print data and print capability information. Examples of the predetermined format include PDF and Printer Working Group (PWG)-Raster.

In step S818, the OS 313 transmits the print data and print capability information transmitted from the print setting extension application 312, or the print data and print capability information generated by the OS 313, to the cloud print service 321 via the print queue.

In step S819, the cloud print service 321 transmits the print data and print capability information transmitted from the client terminal 101 to the cloud-print-enabled printer 104. In the present exemplary embodiment, upon receiving the print data and print capability information from the client terminal 101, the cloud print service 321 transmits the received print data and capability information to the cloud-print-enabled printer 104. Alternatively, the cloud-print-enabled printer 104 may periodically send an inquiry to the cloud print service 321 to acquire print data based on which printing is not executed yet and print capability information corresponding to the print data.

With the above-described configuration, the print data in which the print settings made using the print setting extension application 312 are reflected can be transmitted to the cloud-print-enabled printer 104 via the cloud print service 321.

FIG. 12 is a flowchart illustrating processing to be performed by the OS 313 until the print setting extension application 312 is installed on the client terminal 101. A program for executing the processing illustrated in this flowchart is stored in the storage unit 214 of the client terminal 101. The CPU 212 executes the program to thereby implement the processing.

In step S1201, the CPU 212 displays the screen illustrated in FIG. 4, and receives the printer search instruction. When the user selects the object 401 illustrated in FIG. 4, the CPU 212 receives the printer search instruction.

In step S1202, the CPU 212 determines whether the access token for the cloud print service 321 is stored. The client terminal 101 stores an access token for acquiring information from the cloud print service 421 for each user that logs into the client terminal 101. The CPU 212 determines whether the access token associated with the user that has logged into the client terminal 101 is stored. If the access token is stored (YES in step S1202), the processing proceeds to step S1206 to be described below.

If the access token is not stored (NO in step S1202), the processing proceeds to step S1203. In step S1203, the CPU 212 transmits an authentication request to the cloud print service 321. The CPU 212 receives a URL used to display a screen to input information for authentication from the cloud print service 321.

In step S1204, the CPU 212 accesses the received URL and displays the screen to input information for authentication. Examples of the information for authentication include a user identifier (ID) and a password.

In step S1205, the CPU 212 transmits the input information for authentication to the cloud print service 321, and acquires the access token. If the authentication to the cloud print service 321 is unsuccessful, the CPU 212 cannot acquire the access token, and thus the processing illustrated in FIG. 12 is terminated.

In step S1206, the CPU 212 transmits a request for acquiring information about printers registered in the cloud print service 321 to the cloud print service 321 using the access token. The cloud print service 321 selects information about printers that can be used by the user identified by the received access token, and transmits the printer information to the client terminal 101. In this case, the printer names and the HWIDs registered in association with the printers that can be used by the user identified by the access token received from the client terminal 101 are transmitted to the client terminal 101.

In step S1207, the CPU 212 displays the printer information acquired from the cloud print service 321 on the display unit 216 of the client terminal 101. The display processing in step S1207 enables display of a list of printer information on the area 402 illustrated in FIG. 4.

In step S1208, the CPU 212 determines whether printer information is selected. Until the printer information is selected, the CPU 212 repeatedly performs the processing in step S1208. If the printer information is selected (YES in step S1208), the processing proceeds to step S1209.

In step S1209, the CPU 212 transmits a request for acquiring capability information about the selected printer to the cloud print service 321. In this step, the CPU 212 transmits an inquiry about the setting items preliminarily registered with the OS 313 to the cloud print service 321.

In step S1210, the CPU 212 updates the printer capability information stored in the client terminal 101 based on the information acquired from the cloud print service 321, and generates a print queue.

In step S1211, the CPU 212 transmits a request for acquiring the extended setup information file to the online support service 351. This acquisition request includes the HWID of the printer.

In step S1212, the CPU 212 determines whether the acquisition of the extended setup information file is successful. If the acquisition of the extended setup information file is successful (YES in step S1212), the processing proceeds to step S1213. If the acquisition of the extended setup information file is unsuccessful (NO in step S1212), the processing illustrated in FIG. 12 is terminated.

In step S1213, the CPU 212 transmits a request for acquiring the print setting extension application 312 described in the acquired extended setup information file to the application management service 331. The CPU 212 acquires the application identifier for the print setting extension application 312 from the extended setup information file, designates the acquired application identifier, and transmits the request for acquiring the print setting extension application 312 to the application management service 331.

In step S1214, the CPU 212 determines whether the acquisition of the print setting extension application 312 is successful. If the acquisition of the print setting extension application 312 is unsuccessful (NO in step S1214), the processing illustrated in FIG. 12 is terminated. If the acquisition of the print setting extension application is successful (YES in step S1214), the processing proceeds to step S1215.

In step S1215, the CPU 212 installs the acquired print setting extension application 312, and registers the application identifier for the print setting extension application 312 and the print queue in an associated manner. Further, the CPU 212 registers an event indicating the notification timing with the OS 313. In this case, the event indicating the notification timing is registered such that an event notification is transmitted to the print setting extension application 312 when the print queue associated with the print setting extension application 312 is selected on the print setting screen displayed by the document generation application 315.

The processing up to the registration of the print setting extension application 312 with the client terminal 101 is described above.

Next, processing for making print settings using the installed print setting extension application 312 and generating print data will be described with reference to FIG. 13. A program for executing the processing illustrated in FIG. 13 is stored in the print setting extension application 312, and the program is loaded into the memory 213 of the client terminal 101 and is executed by the CPU 212.

In step S1301, the CPU 212 determines whether an event notification is received. This event is issued by the OS 313 to inform the print setting extension application 312 of the registration timing in step S1215 illustrated in FIG. 12. If the CPU 212 does not receive the event notification (NO in step S1301), the CPU 212 repeatedly performs the processing in step S1301.

If the event notification is received (YES in step S1301), the processing proceeds to step S1302.

In step S1302, the CPU 212 transmits a request for acquiring capability information to the cloud print service 321. The CPU 212 transmits the request for acquiring the capability information on the setting items set in the print setting extension application 312 to the cloud print service 321. In this step, the capability information on the setting items that has not been acquired in step S1206 illustrated in FIG. 12 is also acquired.

In step S1303, the CPU 212 determines whether the acquisition of the capability information is completed. If the acquisition of the capability information is not completed (NO in step S1303), the CPU 212 repeatedly performs the processing in step S1303. If the acquisition of the capability information is completed (YES in step S1303), the processing proceeds to step S1304.

In step S1304, the CPU 212 updates the device capability information with the acquired capability information. When the processing in step S1304 is performed, the capability information on the setting items that has not been acquired by the OS 313 is also stored in the client terminal 101.

In step S1305, the CPU 212 determines whether an instruction to display the print setting screen by the print setting extension application 312 is received. The instruction to display the print setting screen by the print setting extension application 312 is, for example, an instruction to be issued based on a user operation such as selection of the object 1104 illustrated in FIG. 11. If the instruction to display the print setting screen is not received (NO in step S1305), the processing proceeds to step S1309. If the instruction to display the print setting screen is received (YES in step S1305), the processing proceeds to step S1306.

In step S1306, the CPU 212 displays the print setting screen illustrated in FIGS. 10A to 10E based on the printer device information updated in step S1304. Further, the CPU 212 receives a user operation to select the setting values via the displayed print setting screen.

In step S1307, the CPU 212 determines whether an instruction to close the print setting screen is issued by the print setting extension application 312. If the instruction to close the print setting screen is not issued (NO in step S1307), the CPU 212 executes the processing in step S1307. If the instruction to close the print setting screen is issued (YES in step S1307), the processing proceeds to step S1308.

In step S1308, the CPU 212 edits the print setting information with the setting values selected on the print setting screen displayed by the print setting extension application 312. Then, the CPU 212 closes the print setting screen displayed by the print setting extension application 312.

In step S1309, the CPU 212 determines whether the print setting extension application 312 has received the intermediate data from the OS 313. If the print setting extension application 312 has not received the intermediate data (NO in step S1309), the processing returns to step S1305. If the print setting extension application 312 has received the intermediate data (YES in step S1309), the processing proceeds to step S1310.

In step S1310, the CPU 212 generates print data and print capability information based on the intermediate data received by the print setting extension application 312. The CPU 212 generates image data of a predetermined format based on the intermediate data and the print setting information. Further, the CPU 212 generates print capability information described with attribute values defined by the IPP based on the print setting information. Not only the attribute values defined by the IPP, but also any information can be arbitrarily described in the print capability information. Therefore, the setting items and attribute values uniquely defined by the printer vendor can also be described in the print capability information.

In step S1311, the CPU 212 provides the OS 313 with the generated print data. The OS 313 transmits the data received via the print queue to the cloud print service 321.

The description is given above of a flowchart of processing of making print settings using the print setting extension application 312 and generating print data and print capability information.

The above-described processing makes it possible to set setting values on setting items unique to the printer vendor when a print queue associated with a general-purpose cloud printer driver or a local printer driver is selected to transmit print data.

Other Exemplary Embodiments

Embodiments of the present disclosure can also be implemented by executing the following processing. That is, embodiments of the present disclosure can be implemented by processing in software (program) for implementing the functions of the above-described exemplary embodiments is supplied to a system or an apparatus via a network or various storage media, and a computer (or a CPU, a micro processing unit (MPU), etc.) in the system or the apparatus reads out and executes a program code. In this case, the computer program and storage media storing the computer program are included in embodiments of the present disclosure.

According to an aspect of the present invention, it is possible to provide an information processing apparatus capable of acquiring capability information supported by a printer on setting items uniquely defined by a printer vendor even when a general-purpose printer driver is used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-068065, filed Apr. 18, 2022, which is hereby incorporated by reference herein in its entirety.

What is claimed is:

1. An information processing apparatus comprising:
at least one processor that causes the information processing apparatus to:
request, to a cloud print service corresponding to a printer by executing an operating system of the information processing apparatus, first capability information regarding a first setting item supported by the operating system, the first capability information being requested according to an Internet Printing Protocol in response to selection of a print queue of the cloud print service;
acquire, from the cloud print service by executing the operating system of the information processing apparatus, the first capability information;
request, to the cloud print service by executing a print setting application program of the information processing apparatus, second capability information regarding a second setting item uniquely defined by a printer vendor, the second capability information being requested according to the Internet Printing Protocol before a display instruction for displaying a print setting screen is received from a user;
acquire, from the cloud print service by executing the print setting application program of the information processing apparatus, the second capability information;
cause, by executing the print setting application program of the information processing apparatus, a display of the information processing apparatus to display the print setting screen in response to reception of the display instruction from the user, the print setting screen including a first object and a second object, the first object being an object to set a first setting value for the first setting item based on the acquired first capability information, the second object being an object to set a second setting value for the second setting item based on the acquired second capability information; and
transmit, to the cloud print service, print data, the first setting value set via the first object and the second setting value set via the second object.

2. The information processing apparatus according to claim 1, wherein the first capability information is defined by the Internet Printing Protocol.

3. The information processing apparatus according to claim 2, wherein a printer driver for generating image data to be transmitted according to the Internet Printing Protocol and information about the printer are stored in an associated manner.

4. The information processing apparatus according to claim 3, wherein the printer driver generates the image data to be transmitted to the cloud print service.

5. The information processing apparatus according to claim 1,
wherein the printer includes an image forming unit configured to form images on sheets, and
wherein the second setting value is a setting value for a function to fold the sheets conveyed from the image forming unit.

6. The information processing apparatus according to claim 1,
wherein the printer includes an image forming unit configured to form images on sheets, and
wherein the second setting value is a setting value for a function to bind the sheets conveyed from the image forming unit without using staples.

7. The information processing apparatus according to claim 1, wherein the at least one processor further causes the information processing apparatus to display an icon indicating that the print queue corresponds to the cloud print service.

8. A control method for an information processing apparatus, the control method comprising:
requesting, to a cloud print service corresponding to a printer by executing an operating system of the information processing apparatus, first capability information regarding a first setting item supported by the operating system, the first capability information being requested according to an Internet Printing Protocol in response to selection of a print queue of the cloud print service;
acquiring, from the cloud print service by executing the operating system of the information processing apparatus, the first capability information;
requesting, to the cloud print service by executing a print setting application program of the information processing apparatus, second capability information regarding a second setting item uniquely defined by a printer vendor, the second capability information being requested according to the Internet Printing Protocol before a display instruction for displaying a print setting screen is received from a user;
acquiring, from the cloud print service by executing the print setting application program of the information processing apparatus, the second capability information;
causing, by executing the print setting application program of the information processing apparatus, a display of the information processing apparatus to display the print setting screen in response to reception of the display instruction from the user, the print setting screen including a first object and a second object, the first object being an object to set a first setting value for the first setting item based on the acquired first capability information, the second object being an object to set a second setting value for the second setting item based on the acquired second capability information; and
transmitting, to the cloud print service, print data, the first setting value set via the first object, and the second setting value set via the second object.

9. The control method according to claim 8, wherein the first capability information is defined by the Internet Printing Protocol.

10. The control method according to claim 9, wherein a printer driver for generating image data to be transmitted according to the Internet Printing Protocol and information about the printer are stored in an associated manner.

11. The control method according to claim 10, wherein the printer driver generates the image data to be transmitted to the cloud print service.

12. The control method according to claim 8,
wherein the printer includes an image forming unit configured to form images on sheets, and
wherein the second setting value is a setting value for a function to fold the sheets conveyed from the image forming unit.

13. The control method according to claim 8,
wherein the printer includes an image forming unit configured to form images on sheets, and wherein the second setting value is a setting value for a function to bind the sheets conveyed from the image forming unit without using staples.

14. The control method according to claim 8, further comprising displaying an icon indicating that the print queue corresponds to the cloud print service.

15. A non-transitory computer-readable storage medium storing a print setting application program for executing a control method for an information processing apparatus, the information processing apparatus requesting, to a cloud print service corresponding to a printer by an operating system of the information processing apparatus, first capability information regarding a first setting item supported by the operating system, the first capability information being requested according to an Internet Printing Protocol in response to selection of a print queue of the cloud print service, and the information processing apparatus acquiring the first capability information, the control method comprising:

requesting, to the cloud print service, second capability information regarding a second setting item uniquely defined by a printer vendor, the second capability information being requested according to the Internet Printing Protocol before a display instruction for displaying a print setting screen is received from a user;

acquiring, from the cloud print service, the second capability information; and causing a display of the information processing apparatus to display the print setting screen in response to reception of the display instruction from the user, the print setting screen including a first object and a second object, the first object being an object to set a first setting value for the first setting item based on the acquired first capability information, the second object being an object to set a second setting value for the second setting item based on the acquired second capability information.

16. The non-transitory computer-readable storage medium according to claim 15, wherein the first capability information is defined by the Internet Printing Protocol.

17. The non-transitory computer-readable storage medium according to claim 16, wherein a printer driver for generating image data to be transmitted according to the Internet Printing Protocol and information about the printer are stored in an associated manner.

18. The non-transitory computer-readable storage medium according to claim 17, wherein the printer driver generates the image data to be transmitted to the cloud print service.

19. The non-transitory computer-readable storage medium according to claim 15,
wherein the printer includes an image forming unit configured to form images on sheets, and
wherein the second setting value is a setting value for a function to fold the sheets conveyed from the image forming unit.

20. The non-transitory computer-readable storage medium according to claim 15,
wherein the printer includes an image forming unit configured to form images on sheets, and
wherein the second setting value is a setting value for a function to bind the sheets conveyed from the image forming unit without using staples.

21. The non-transitory computer-readable storage medium according to claim 15, the control method further comprising displaying an icon indicating that the print queue corresponds to the cloud print service.

* * * * *